US012654707B1

(12) United States Patent
Edren et al.

(10) Patent No.: US 12,654,707 B1
(45) Date of Patent: Jun. 16, 2026

(54) DYNAMIC WHEEL CONFIGURATION ADJUSTMENT BASED ON ENVIRONMENTAL CONDITIONS

(71) Applicant: Zoox, Inc., Foster City, CA (US)

(72) Inventors: Johannes Edren, Belmont, CA (US); Ahditya Melkote, Foster City, CA (US); Joseph Whinnery, Soquel, CA (US)

(73) Assignee: Zoox, Inc., Foster City, CA (US)

( * ) Notice: Subject to any disclaimer, the term of this patent is extended or adjusted under 35 U.S.C. 154(b) by 233 days.

(21) Appl. No.: 18/200,780

(22) Filed: May 23, 2023

(51) Int. Cl.
B60W 30/18 (2012.01)
B62D 6/04 (2006.01)

(52) U.S. Cl.
CPC ......... B60W 30/18172 (2013.01); B62D 6/04 (2013.01); *B60W 2710/20* (2013.01)

(58) Field of Classification Search
CPC ........ B60W 30/18172; B60W 2710/20; B62D 6/04
See application file for complete search history.

(56) References Cited

U.S. PATENT DOCUMENTS

| | | | | |
|---|---|---|---|---|
| 11,285,773 B1 * | 3/2022 | Hall | ................... | B60G 17/06 |
| 2008/0283325 A1 * | 11/2008 | Kodama | ............ | B60G 17/0164 |
| | | | | 180/243 |
| 2010/0217491 A1 * | 8/2010 | Naito | .................... | B60G 7/006 |
| | | | | 701/49 |
| 2013/0096793 A1 * | 4/2013 | Krosschell | ........... | F16H 63/067 |
| | | | | 701/68 |

| | | | | |
|---|---|---|---|---|
| 2015/0005982 A1 * | 1/2015 | Muthukumar | ........ | B60T 8/1725 |
| | | | | 701/1 |
| 2015/0251541 A1 * | 9/2015 | Drako | .................... | B60L 3/106 |
| | | | | 701/22 |
| 2017/0137023 A1 * | 5/2017 | Anderson | ............. | B60W 50/14 |
| 2019/0325595 A1 | 10/2019 | Stein et al. | | |
| 2021/0354723 A1 | 11/2021 | McCool et al. | | |

(Continued)

FOREIGN PATENT DOCUMENTS

| | | |
|---|---|---|
| JP | 2019104377 A | 6/2019 |
| WO | WO2024086589 A1 | 4/2024 |

OTHER PUBLICATIONS

Non-Final Office Action for related U.S. Appl. No. 18/200,823, dated Dec. 27, 2024 (16 pages).

(Continued)

*Primary Examiner* — Khoi H Tran
*Assistant Examiner* — Tristan J Greiner
(74) *Attorney, Agent, or Firm* — Lee & Hayes, P.C.

(57) ABSTRACT

Systems and techniques for determining adverse traction conditions currently and/or likely to be being experienced by a vehicle and mitigating such conditions are described. Using sensor data, a vehicle computing device may determine an adverse traction conditions and various attributes of the condition. The vehicle computing device may adjust individual wheel configurations to address this condition, for example, by increasing or decreasing cross-corner wheels, rapidly and repeatedly increasing and decreasing particular wheels, and/or steering wheel individual to increase traction overall and/or reduce the speed of the vehicle (e.g., without using brakes). When normal traction conditions are recognized, the vehicle computing system may return the wheel suspension and steering configurations back to normal.

20 Claims, 6 Drawing Sheets

(56) References Cited

U.S. PATENT DOCUMENTS

| | | | |
|---|---|---|---|
| 2021/0402984 A1* | 12/2021 | Funke | .................. B60W 10/20 |
| 2022/0306154 A1 | 9/2022 | Fei et al. | |
| 2023/0271594 A1 | 8/2023 | Chen | |
| 2024/0001924 A1 | 1/2024 | Giovanardi et al. | |

OTHER PUBLICATIONS

U.S. Appl. No. 63/456,668, Jiang, 2023, pp. 1-52.

Final Office Action dated May 29, 2025, for related U.S. Appl. No. 18/200,823, to Edren, entitled "Dynamic Wheel Configuration Adjustment Based on Environmental Conditions," 22 pages.

Final Office Action for related U.S. Appl. No. 18/200,823, dated Nov. 6, 2025, 19 pages.

* cited by examiner

100 ⇘

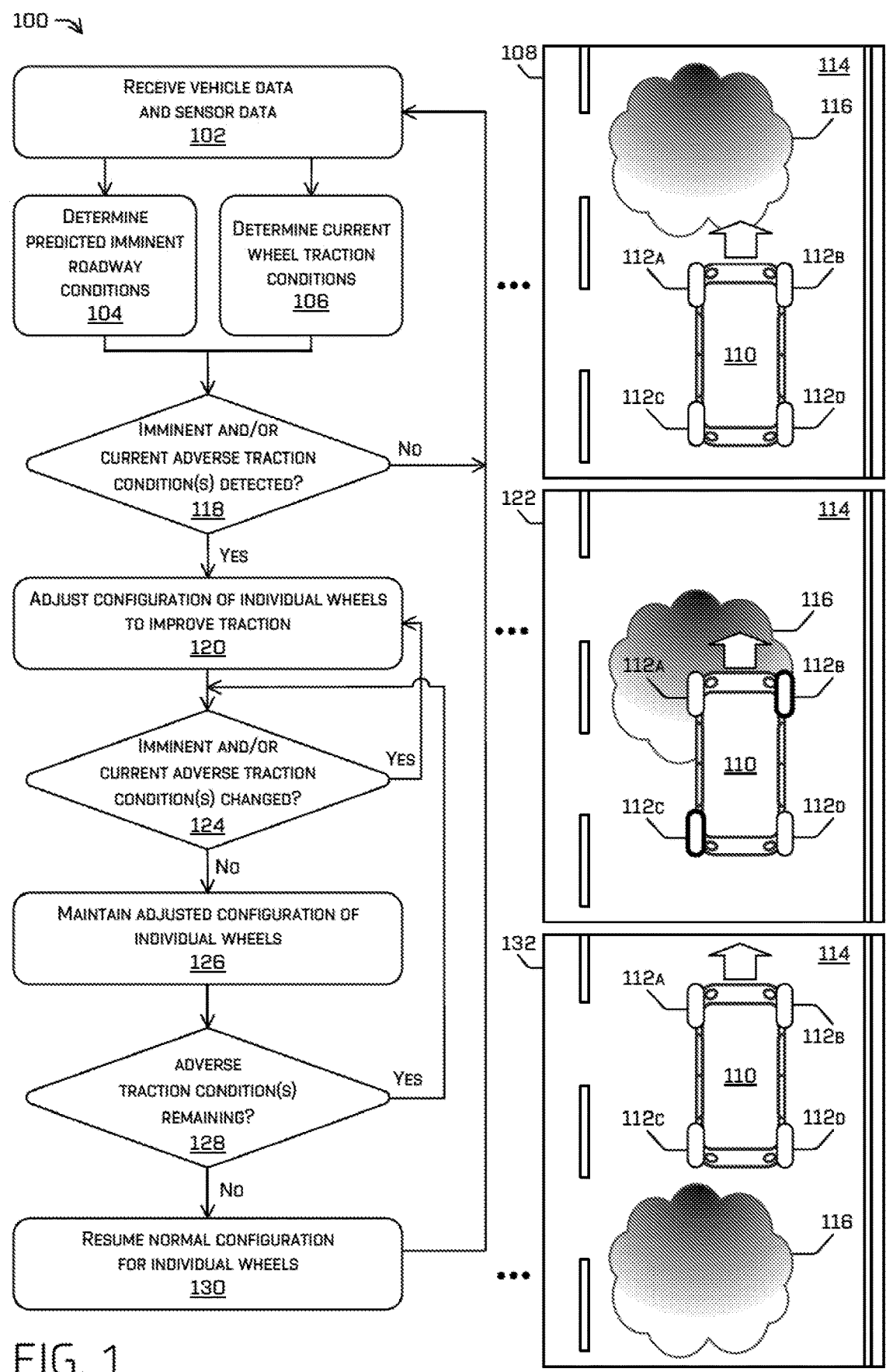

RECEIVE VEHICLE DATA
AND SENSOR DATA
102

DETERMINE
PREDICTED IMMINENT
ROADWAY
CONDITIONS
104

DETERMINE CURRENT
WHEEL TRACTION
CONDITIONS
106

IMMINENT AND/OR
CURRENT ADVERSE TRACTION
CONDITION(S) DETECTED?
118
No

YES

ADJUST CONFIGURATION OF INDIVIDUAL WHEELS
TO IMPROVE TRACTION
120

IMMINENT AND/OR
CURRENT ADVERSE TRACTION
CONDITION(S) CHANGED?
124
YES

No

MAINTAIN ADJUSTED CONFIGURATION OF
INDIVIDUAL WHEELS
126

ADVERSE
TRACTION CONDITION(S)
REMAINING?
128
YES

No

RESUME NORMAL CONFIGURATION
FOR INDIVIDUAL WHEELS
130

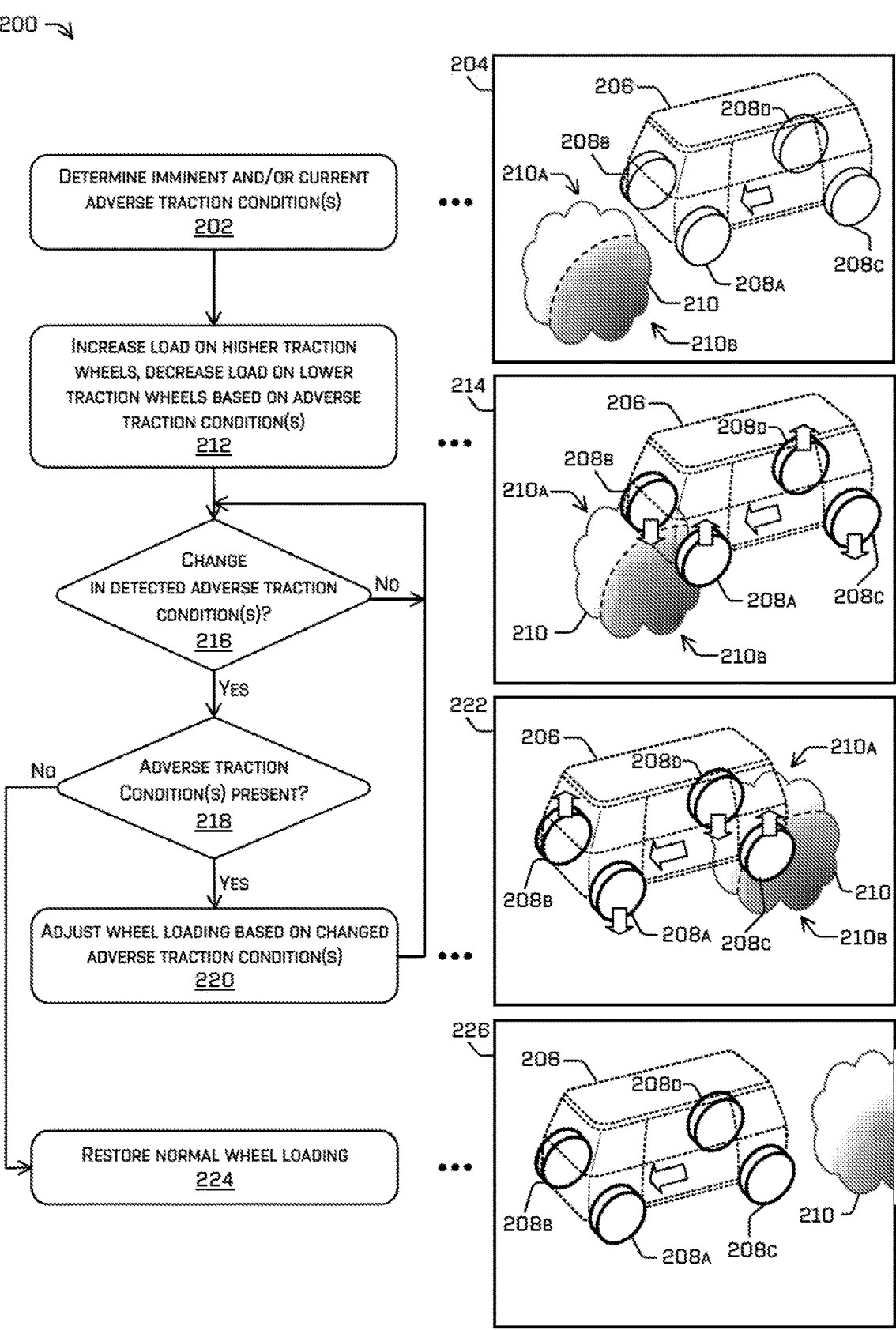

DETERMINE IMMINENT AND/OR CURRENT ADVERSE TRACTION CONDITION(S)
202

INCREASE LOAD ON HIGHER TRACTION WHEELS, DECREASE LOAD ON LOWER TRACTION WHEELS BASED ON ADVERSE TRACTION CONDITION(S)
212

CHANGE IN DETECTED ADVERSE TRACTION CONDITION(S)?
216

NO

YES

ADVERSE TRACTION CONDITION(S) PRESENT?
218

NO

YES

ADJUST WHEEL LOADING BASED ON CHANGED ADVERSE TRACTION CONDITION(S)
220

RESTORE NORMAL WHEEL LOADING
224

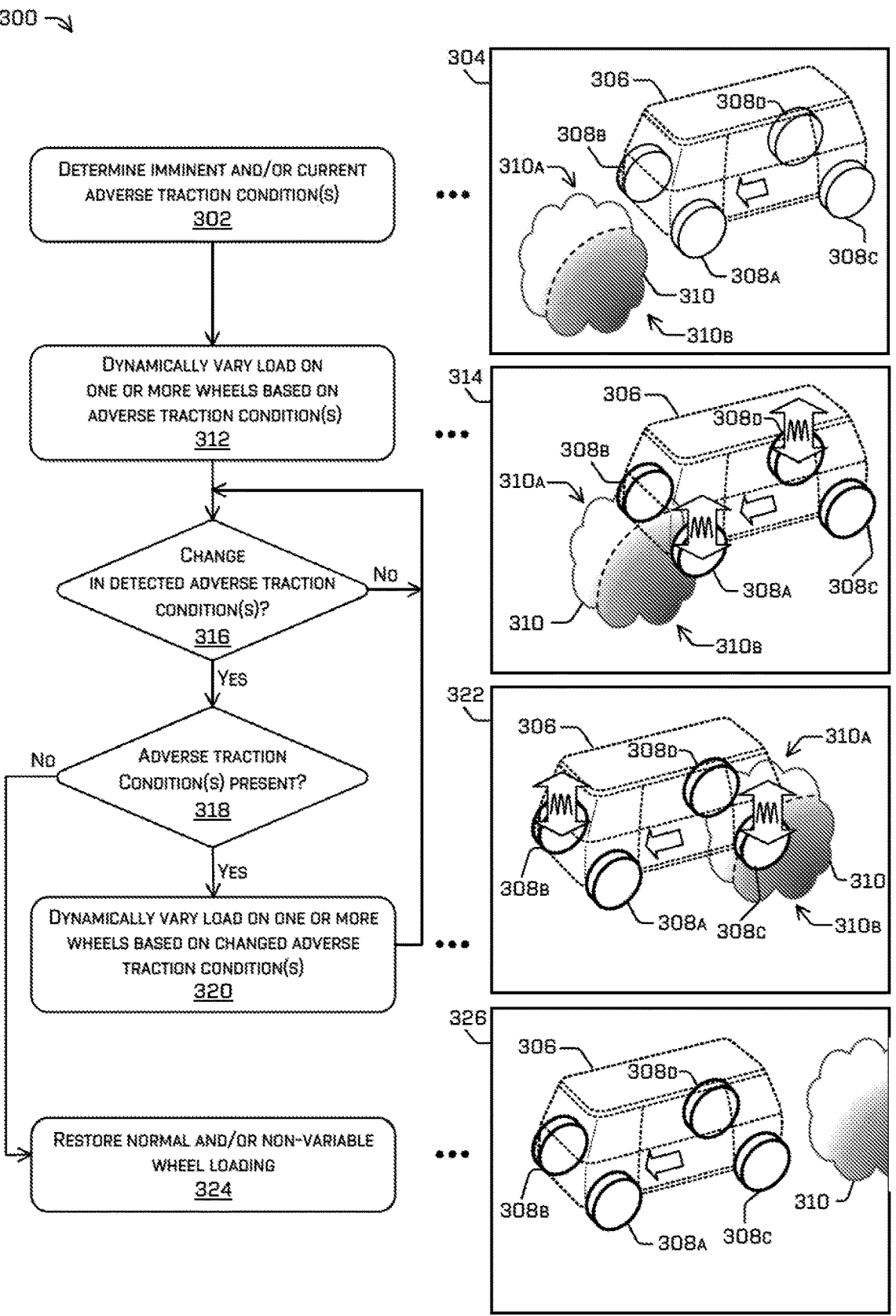

DETERMINE IMMINENT AND/OR CURRENT
ADVERSE TRACTION CONDITION(S)
302

DYNAMICALLY VARY LOAD ON
ONE OR MORE WHEELS BASED ON
ADVERSE TRACTION CONDITION(S)
312

CHANGE
IN DETECTED ADVERSE TRACTION
CONDITION(S)?
316

No

YES

ADVERSE TRACTION
CONDITION(S) PRESENT?
318

No

YES

DYNAMICALLY VARY LOAD ON ONE OR MORE
WHEELS BASED ON CHANGED ADVERSE
TRACTION CONDITION(S)
320

RESTORE NORMAL AND/OR NON-VARIABLE
WHEEL LOADING
324

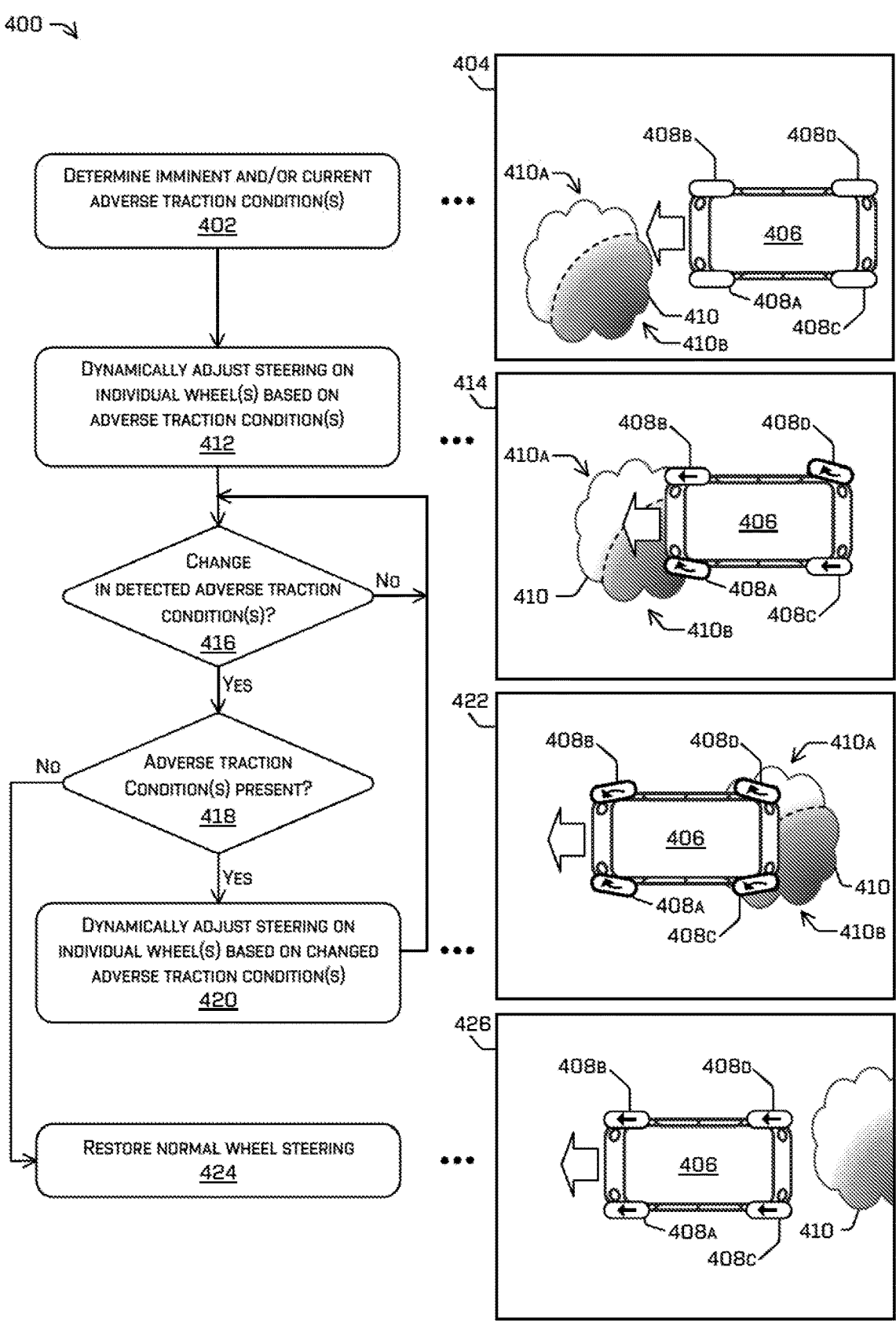

DETERMINE IMMINENT AND/OR CURRENT ADVERSE TRACTION CONDITION(S)
402

DYNAMICALLY ADJUST STEERING ON INDIVIDUAL WHEEL(S) BASED ON ADVERSE TRACTION CONDITION(S)
412

CHANGE IN DETECTED ADVERSE TRACTION CONDITION(S)?
416

No

YES

ADVERSE TRACTION CONDITION(S) PRESENT?
418

No

YES

DYNAMICALLY ADJUST STEERING ON INDIVIDUAL WHEEL(S) BASED ON CHANGED ADVERSE TRACTION CONDITION(S)
420

RESTORE NORMAL WHEEL STEERING
424

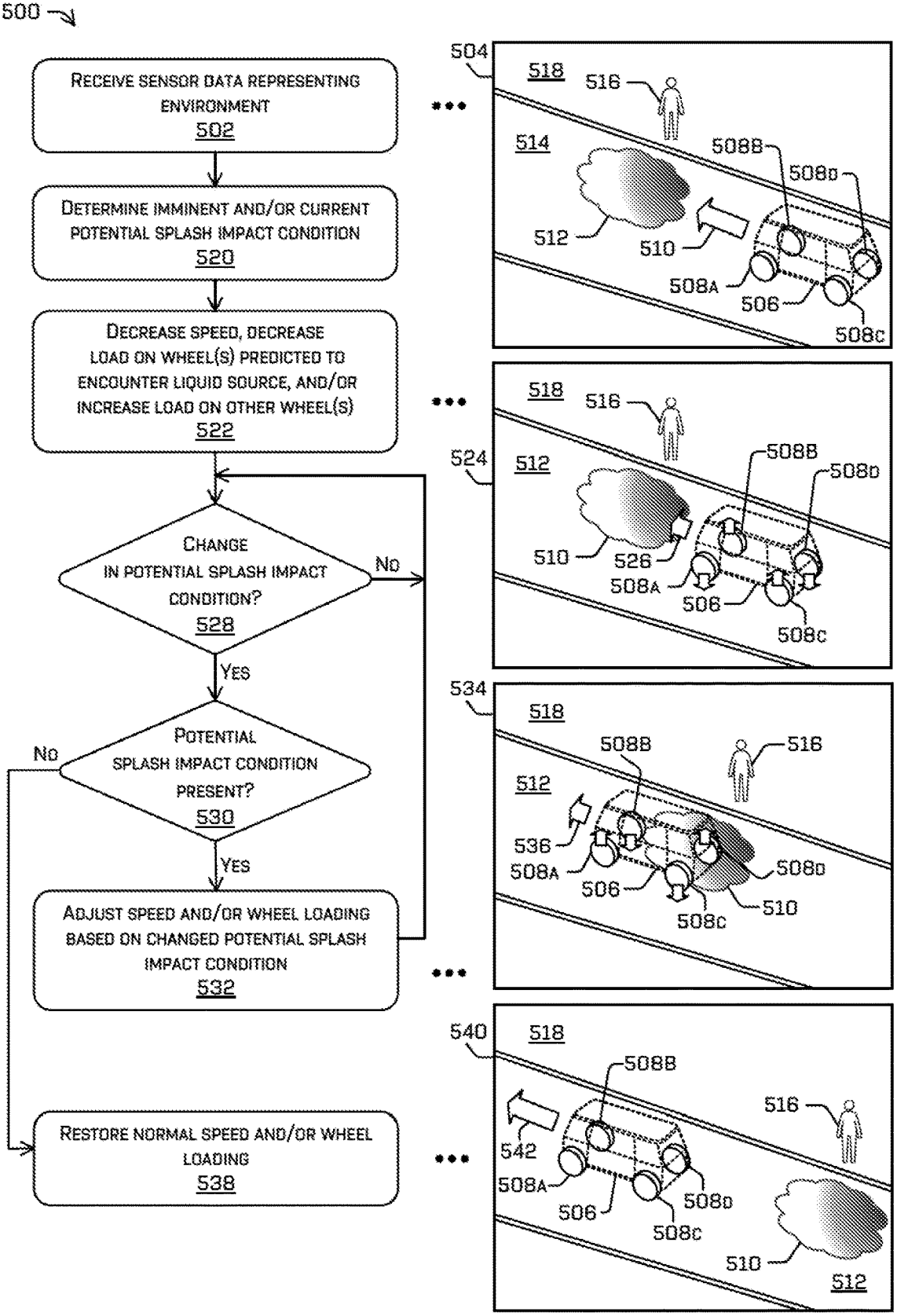

RECEIVE SENSOR DATA REPRESENTING ENVIRONMENT
502

DETERMINE IMMINENT AND/OR CURRENT POTENTIAL SPLASH IMPACT CONDITION
520

DECREASE SPEED, DECREASE LOAD ON WHEEL(S) PREDICTED TO ENCOUNTER LIQUID SOURCE, AND/OR INCREASE LOAD ON OTHER WHEEL(S)
522

CHANGE IN POTENTIAL SPLASH IMPACT CONDITION?
528

No

Yes

POTENTIAL SPLASH IMPACT CONDITION PRESENT?
530

No

Yes

ADJUST SPEED AND/OR WHEEL LOADING BASED ON CHANGED POTENTIAL SPLASH IMPACT CONDITION
532

RESTORE NORMAL SPEED AND/OR WHEEL LOADING
538

FIG. 5

DYNAMIC WHEEL CONFIGURATION ADJUSTMENT BASED ON ENVIRONMENTAL CONDITIONS

BACKGROUND

When in motion, a vehicle may encounter roadway conditions that affect the traction of the wheels. At times, the traction of individual wheels may be affected differently. For example, the two wheels on one side of a vehicle may travel over a puddle or a patch of ice while the remaining wheels on the other side of the vehicle may remain on a dry surface. In such situations, the traction of the wheels on the dry surface may remain good traction with the roadway while the wheels on the other side of the vehicle may experience reduced traction. This may result in unpredictable vehicle behavior. Applying the brakes to slow the vehicle in such conditions may further cause unpredictable behaviors at least because, while the braking force applied at the individual wheels may be the same, the response of the wheels to such braking forces may differ due to the difference in traction available at the individual wheels. For example, the wheels with lower traction may completely stop in response to the braking while the wheels with better traction may simply slow, potentially resulting in a total loss of traction at the previously lower traction wheels. Safely and accurately controlling a vehicle through adverse roadway conditions and situations where wheel traction varies among the vehicle's wheels may, at times, present challenges.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

FIG. 1 illustrates an example process for adjusting individual wheel configuration(s) based on determined environmental and vehicle conditions, in accordance with examples of the disclosure.

FIG. 2 illustrates an example process for dynamically adjusting individual wheel loading based on determined environmental and vehicle conditions, in accordance with examples of the disclosure.

FIG. 3 illustrates an example process for dynamically varying individual wheel loading based on determined environmental and vehicle conditions, in accordance with examples of the disclosure.

FIG. 4 illustrates an example process for dynamically adjusting individual wheel steering based on determined environmental and vehicle conditions, in accordance with examples of the disclosure.

FIG. 5 illustrates an example process for dynamically adjusting individual wheel loading based on determined potential splash impact conditions, in accordance with examples of the disclosure.

DETAILED DESCRIPTION

Figure 6:
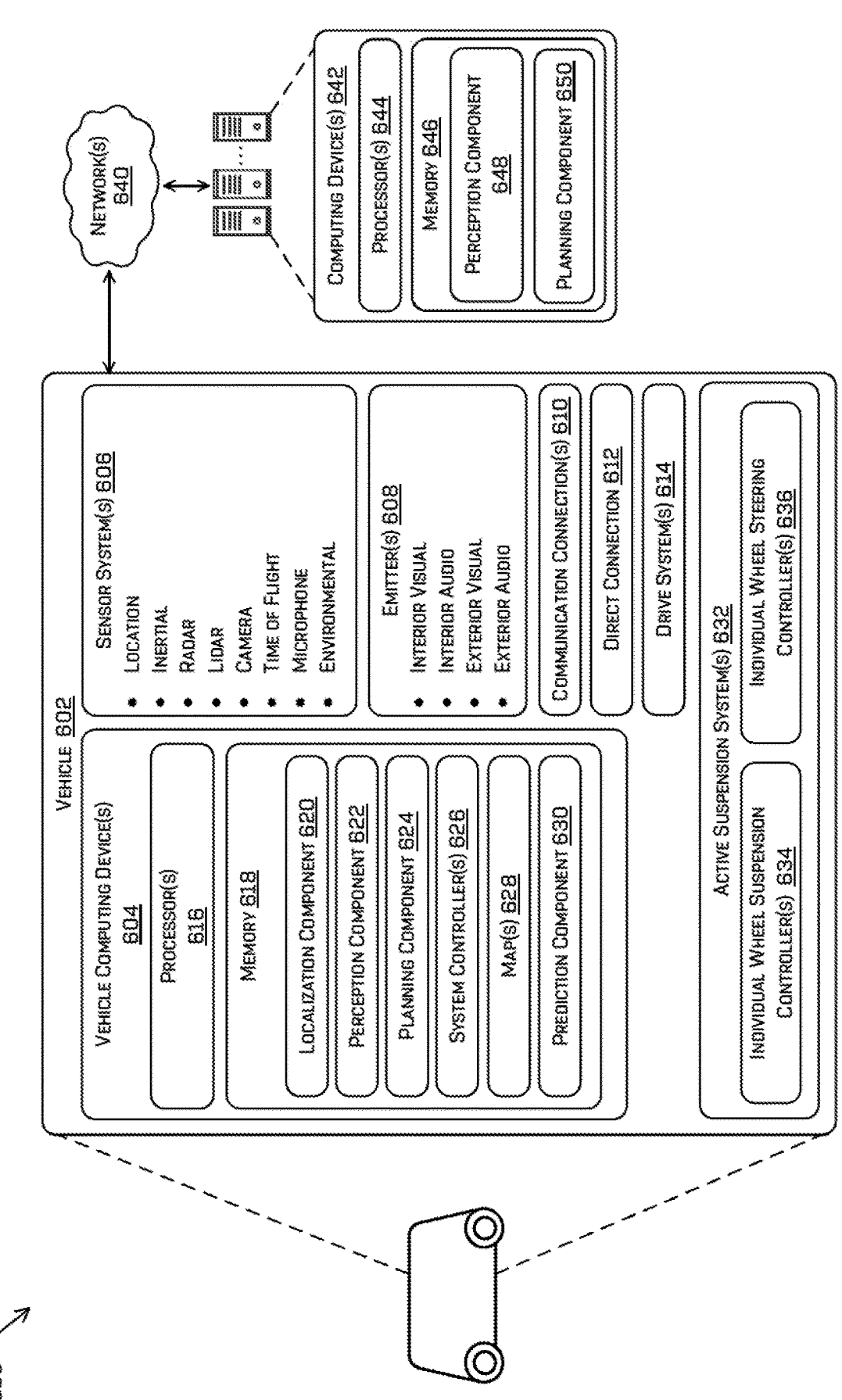
FIG. 6 depicts a block diagram of an example system for implementing the techniques described herein.

Techniques for dynamically adjusting individual wheel configurations at a vehicle to more safely and accurately control a vehicle while traversing particular roadway conditions and surfaces are discussed herein. For example, techniques may include determining a current wheel traction and/or other wheel condition for individual wheels of a vehicle based on vehicle component sensors, such as wheel speed sensors and/or wheel encoders. Techniques may also, or instead, include determining surface conditions for the roadway on which the vehicle will be traveling based on sensor data, such as lidar data, radar data, images, etc. Using the determined wheel and/or surface conditions, a vehicle computing system may determine whether there is, or is likely to be, an adverse condition that may diminish wheel traction at one or more of the vehicle's wheels. In response to detecting an adverse traction condition the vehicle computing system may adjust a suspension and/or steering configuration of one or more of the vehicle's wheels to improve traction and control of the vehicle. For example, the vehicle computing system may adjust the load (e.g., once and/or repeatedly) at individual wheels relative to a body of the vehicle (e.g., effectively adjusting the proportion of the weight of the body supported at the wheel using suspension components) to increase vehicle load on the wheel with superior traction and/or reduce vehicle load on the wheel with reduced traction. The vehicle computing system may also, or instead, adjust the steering configuration of individual wheels to compensate for drag that may be introduced by the surface condition and/or slow the vehicle. Any of these configuration adjustments may be used in combination to improve overall vehicle control in adverse traction conditions. In response to detecting a potential splash impact condition where one or more pedestrians, vulnerable road users (VRUs), and/or other objects outside the vehicle may be affected by a splash of liquid encountered by the vehicle, the vehicle computing system may adjust a suspension and/or steering configuration of one or more of the vehicle's wheels to reduce or eliminate the impact of the potential splash of liquid. By using the disclosed adverse traction and potential splash impact condition determinations and responsive suspension and steering adjustment operations, the systems and techniques described herein facilitate the improved control of the vehicle, increasing the safety and efficiency of vehicle operation and passenger and pedestrian comfort and safety.

A vehicle computing system configured at a vehicle traversing an environment may identify or otherwise detect objects and surfaces within the environment for a current time and/or vehicle location. This detection may include determining various properties, attributes, features, and/or classifications (referred to generally herein as "attributes") of the environment and the objects and surfaces therein. These attributes may be determined based on sensor data collected by sensors configured at the vehicle. Sensor data may include image data, radar data, lidar data, sonar data, and the like. Based on the sensor data and/or attributes of surfaces determined based thereon, the vehicle computing system may determine whether a surface that the vehicle is predicted to traverse represents an adverse traction condition and/or a potential splash impact condition. The vehicle computing system may also, or instead, use mapping data to determine a probability of an adverse traction condition and/or a potential splash impact condition in the environment (e.g., based on elevations on the roadway surface, current weather conditions, user-reported adverse traction conditions, user-reported potential splash impact condition, user reported VRUs, etc.). Mapping data may include nominal feature data for an environment (e.g., a three-dimensional (3D) map useful for localization of a vehicle or similar) which can be used to compare sensor data to determine if an adverse traction condition exists when a vehicle is in operation. In some examples, this can include encoding nominal surface parameters into the map data. In some examples, known adverse traction conditions may be encoded into map data and/or conditions that may result in adverse conditions (e.g., an area that routinely ices over when temperatures are low enough and/or there is rain). Based on such data, the vehicle computing system may determine a planned trajectory for the vehicle and a roadway within the environment upon which the vehicle is predicted to travel. The vehicle computing system may then determine whether there is a surface associated with an adverse traction condition and/or a potential splash impact condition in the path of the vehicle along the trajectory (e.g., on a surface of the roadway). Examples of surfaces that may be associated with adverse traction conditions include puddles, standing water, running or moving water, ice, slush, snow, etc. Examples of surfaces that may be associated with potential splash impact conditions include puddles or other standing or running liquids that are located relatively proximate to pedestrians, other vehicles (e.g., that may have an open door, truck, hatch, etc.), bicycles, VRUs, etc.

In examples, the vehicle computing system may autonomously control a vehicle using a planned trajectory based on a determined adverse traction condition and/or a potential splash impact condition. For example, a planning component of, or in communication with, the vehicle computing system may determine a trajectory through an environment that avoids or minimizes the passage of the vehicle over a surface in the environment that is associated with an adverse traction condition and/or a potential splash impact condition. Alternatively or additionally, the vehicle computing system and/or a planning component associated therewith may generate a trajectory for autonomous control of the vehicle that includes one or more controls to adjust one or more suspension components and/or vehicle speed as described herein based on determining an adverse traction condition and/or a potential splash impact condition. These and any other examples described herein may be used to control or assist in controlling any type of fully and/or partially autonomous vehicles.

The vehicle computing system may also, or instead, use one or more vehicle component sensors configured at the vehicle to determine whether the vehicle is currently experiencing adverse traction conditions. For example, the vehicle may be configured with wheel rotational speed sensors, wheel encoders, and/or one or more other components for individual wheels of the vehicle that may be used to determine traction at the individual wheels. In examples, the vehicle computing system may compare the traction measured at individual wheels to determine if one or more wheels are experiencing a loss of traction relative to one or more other wheels. If so, the vehicle computing system may determine that the wheel(s) having reduced traction may be subject to an adverse traction condition (e.g., on a puddle, ice, standing water, etc.).

The vehicle computing system may also take into account other vehicle and/or component conditions and data in determining an adverse traction condition. For example, in determining an adverse traction condition, the vehicle may account for the pressure in the individual tires, the tread depth on the individual tires, the wear on the individual tires, etc. In some cases, a worn or improperly pressurized tire may make a wheel may be more prone to experiencing a reduction of traction. Other vehicle conditions, such as total vehicle weight, weight distribution, current speed, acceleration, etc. may be taken into account by a vehicle computing system when determining whether an upcoming surface represents an adverse traction condition and/or whether one or more individual wheels is currently experiencing an adverse traction condition.

In examples, the vehicle computing system may determine a particular type of unbalanced or uneven adverse traction condition that represents a potential change in traction at one or more wheels of the vehicle that differs from the traction available at one or more other wheels. For example, the vehicle computing system may determine if the vehicle is experiencing a hydroplaning or aquaplaning condition at fewer than all the wheels of the vehicle. Hydroplaning or aquaplaning conditions may be the result of increased hydrostatic pressure at one or more wheels at the contact surface due to the presence of a liquid, such as when a layer of liquid is introduced between a wheel and a surface of a roadway. For instance, the wheels on one side of the vehicle may encounter a puddle that causes a reduction in traction at those wheels, while the wheels at the other side of the vehicle may not encounter the puddle and may therefore retain full traction. In various examples, these and similar conditions where the traction across the individual wheels of a vehicle varies may be detected by a vehicle computing system as described herein.

In various examples, the vehicle at which the vehicle computing system may be configured may include active suspension components and/or individual wheel steering components that may be under control of the vehicle computing system. For example, the vehicle may be equipped with active suspension components (e.g., shocks, struts, springs, hydraulic components, pneumatic components, etc.) that may allow the vehicle computing system to increase and/or decrease the vertical load at individual wheels of the vehicle independently of the remaining wheels (e.g., by increasing and/or decreasing pressure and/or force at individual wheel suspension components). The vehicle may also, or instead, be equipped with four-wheel steering components that may allow the vehicle computing system to steer individual wheels or otherwise adjust the lateral load at the vehicle independently of other wheels.

In examples, in response to detecting an adverse traction condition and/or a potential splash impact condition at a surface on which the vehicle is or will be traversing, the vehicle computing system may modify the load on individual wheels of the vehicle using active suspension components. For example, the vehicle computing system may determine that the driver's side wheels of the vehicle will be encountering an adverse traction condition when those wheels traverse a puddle located in the vehicle's trajectory, but that the passenger side wheels will not encounter this puddle. The vehicle computing system may, in response, determine that the leading axle driver's side wheel is likely to have reduced traction due to the puddle. The vehicle computing system may adjust one or more active suspension components to reduce the load at the leading axle driver's side wheel in preparation for encountering the puddle while increasing the load at the opposite wheel on the same axle that has greater traction (i.e., the leading axle passenger's side wheel). To further balance the load of the vehicle, the vehicle computing system may perform an opposite adjustment on the trailing axle by adjusting one or more active suspension components to reduce the load at the trailing axle passenger's side wheel and increase the load at the trailing axle driver's side wheel. Note that as used herein, "axle" refers to a longitudinal vehicle wheel position relative to a vehicle body. For example, wheels located at the leading edge of a vehicle laterally opposite one another and closer to the leading edge of the vehicle than the trailing wheels. Such wheels located at the leading edge of the vehicle may be referred to as wheels at the "leading axle," but are not necessarily mechanically connected to one another by a physical axle.

As the vehicle traverses the puddle (e.g., when the vehicle computing system determines that the trailing axle will be encountering the puddle and/or the leading axle has exited the puddle), the vehicle computing system may reverse or adjust this suspension orientation. For example, based on determining that the vehicle has moved substantially through the puddle and the leading axle is out of the puddle while the trailing axle will soon be traversing the puddle, the vehicle computing system may then reduce the load at the trailing axle driver's side wheel, increase the load at the trailing axle passenger's side wheel, increase the load at the leading axle driver's side wheel, and reduce the load at the leading axle passenger's side wheel. This cross-corner balancing of the wheels may maintain stable control of the vehicle and passenger comfort while increasing the traction available to the vehicle overall when encountering an unbalanced or uneven adverse traction condition. As used herein, "cross-corner" may refer to opposite corners of a vehicle, such as a driver's side leading axle corner and a passenger's side trailing axle corner, and vice versa.

When the vehicle computing system determines that the vehicle has ceased exposure to the adverse traction condition and/or is no longer predicted to encounter an adverse traction condition, the vehicle computing system may adjust one or more active suspension components to return the individual wheels to normal loads and/or otherwise normalize the suspension.

In a potential splash impact condition example, the vehicle computing system may determine that the passenger's side wheels of the vehicle will be encountering a potential splash impact condition when those wheels traverse a puddle located in the vehicle's trajectory that is proximate to a pedestrian (e.g., on the sidewalk next to the puddle, but that the driver's side wheels will not encounter this condition (e.g., are on the opposite side of the vehicle from the pedestrian, and therefore will no splash the pedestrian even if those wheels encounter the puddle). The vehicle computing system may, in response, reduce the speed of the vehicle to reduce the splashing that may be induced by the passenger's side wheels traveling through the puddle. The vehicle computing system may also, or instead, adjust one or more active suspension components to reduce the load at the leading axle passenger's side wheel in preparation for encountering the puddle while, in examples, increasing the load at the opposite wheel on the same axle (i.e., the leading axle driver's side wheel) to balance the vehicle load. To further balance the load of the vehicle, the vehicle computing system may perform an opposite adjustment on the trailing axle by adjusting one or more active suspension components to reduce the load at the trailing axle driver's side wheel and increase the load at the trailing axle passenger's side wheel.

In determining a potential splash condition or potential splash impact condition, the vehicle computing system may determine a potential area of movement and/or trajectory of movement (e.g., a predicted trajectory) for an object that may be impacted by a splash. For example, a pedestrian (in motion or at rest) in the environment may move in any direction at any time. However, the speed of movement of a pedestrian may be relatively limited. The vehicle computing system may determine a predicted or potential movement area of a pedestrian (e.g., using a prediction component and/or other components as described herein based on a classification of the pedestrian). The vehicle computing system may then use that to determine a potential splash impact condition, for example, by expanding the area associated with the potential splash impact condition based on possible movements of the pedestrian.

Alternatively or additionally, a motorcycle in the environment may be relatively predictable and therefore the vehicle computing system may determine a predicted trajectory of movement for such an object. For example, the vehicle computing system may determine a predicted trajectory for a motorcycle (e.g., using a prediction component and/or other components as described herein based on a classification of the pedestrian). The vehicle computing system may then use the predicted trajectory to determine a potential splash impact condition, for example, by expanding the area associated with the potential splash impact condition based on predicted trajectory of the motorcycle.

The vehicle computing system may also, or instead, take into account a potential area of movement or predicted trajectory for an object in determining suspension adjustments. For example, the vehicle computing system may entirely steer around a potential splash impact condition area determined based on a potential area of movement or predicted trajectory for an object and/or adjust loads at wheel such that impact on the object is mitigated even if the object moves within its determined potential area of movement or along its predicted trajectory.

As the vehicle traverses the puddle (e.g., when the vehicle computing system determines that the trailing axle will be encountering the puddle and/or the leading axle has exited the puddle), the vehicle computing system may reverse or adjust this suspension orientation. For example, based on determining that the vehicle has moved substantially through the puddle and the leading axle is out of the puddle while the trailing axle will soon be traversing the puddle, the vehicle computing system may then reduce the load at the trailing axle passenger's side wheel, increase the load at the trailing axle driver's side wheel, increase the load at the leading axle passenger's side wheel, and reduce the load at the leading axle driver's side wheel. This cross-corner balancing of the wheels may maintain stable control of the vehicle and passenger comfort while increasing the traction available to the vehicle overall when encountering an unbalanced or uneven adverse traction condition.

When the vehicle computing system determines that the vehicle has ceased exposure to the potential splash impact condition and/or is no longer predicted to encounter a potential splash impact condition, the vehicle computing system may adjust one or more active suspension components to return the individual wheels to normal loads and/or otherwise normalize the suspension.

In examples, a vehicle computing system may use data from vehicle component sensors configured at the vehicle to determine whether the vehicle is currently experiencing a reduced traction condition at one or more wheels to increase the certainty of a potential splash impact condition determination and/or to confirm such a condition. For example, the vehicle may be configured with wheel rotational speed sensors, wheel encoders, and/or one or more other components for individual wheels of the vehicle that may be used to determine traction at the individual wheels. While the vehicle is traversing an area associated with potential splash impact condition (e.g., a puddle, standing water, running water, etc.), the vehicle computing system may use data from one or more components to confirm or otherwise assess whether the wheel(s) determined as exposed to the potential splash impact condition are experiencing reduced traction. If so, the vehicle computing system may continue suspension adjustments to address the potential splash impact condition. If the vehicle computing system determines that such wheels are not experiencing reduced traction, or experiencing less reduced traction than expected, the vehicle computing system may reassess or otherwise reevaluate whether the condition remains present or likely and may return suspension adjustments to normal and/or implement other suspension adjustments based on the reevaluation.

In various examples, the vehicle computing system may repeatedly modify the amount of load on individual wheels of the vehicle by rapidly increasing and decreasing the load at particular individual wheels using active suspension components. The extent of such oscillatory load increases and decreases may be based on the amount of traction determined for such wheels. For instance, the vehicle computing system may determine an individual wheel that has, or is likely to have, reduced traction due to an adverse traction condition. The vehicle computing system may then repeatedly increase and decrease the load at the wheel (e.g., rapidly), which may repeatedly vary the amount of traction at the wheel, which may result in an overall increase of wheel traction at that wheel over the period of repeated load adjustments. The vehicle computing system may also, during this process, perform traction determinations to determine at which load the wheel may have improved and/or reduced traction (e.g., to determine an improved traction position for the wheel). The vehicle computing system may perform similar oscillatory adjustments to the load at one or more other wheels, for example, to balance out vertical vehicle motion that such oscillatory adjustments may introduce in order to improve passenger comfort.

These oscillatory adjustments may be used in conjunction with cross-corner suspension adjustments described above. For example, the vehicle computing system may determine a particular cross-corner adjustment for the vehicle's wheels to improve overall traction during traversal of a surface that may introduce an adverse traction condition (e.g., reduce load at the leading axle passenger's side wheel and trailing axle driver's side wheel, increase load at the trailing axle passenger's side wheel and leading axle driver's side wheel). The vehicle computing system may then repeatedly (e.g., rapidly) increase and decrease the load at the individual wheels about a median wheel load used for the initial cross-corner suspension adjustments. The vehicle computing system may implement these repeated load adjustments at the individual wheel in an oscillatory and/or sinusoidal manner. In examples, the vehicle computing system may implement these oscillatory suspension adjustments at the individual wheels so that passenger comfort and vehicle control are improved (e.g., so that individual wheels oscillate in or out of phase with one another and/or at particular phases relative to the other wheels).

In examples, the repeated load adjustments may be performed in a non-uniform manner. For example, load adjustments may be implemented in an oscillatory, decaying sinusoidal manner where the load adjustments are increasingly reduced until such adjustments decay to an endpoint associated with a particular load. This particular load may be a load determined to provide the greatest traction for the associated wheel based on the current and/or predicted traction conditions. Other non-uniform and/or irregular repeated load adjustments may be used according to various examples.

In examples, the oscillatory load adjustments applied to a particular wheel may be rapidly implemented (e.g., with high frequency), relatively small load changes (e.g., low amplitude). The frequency and/or amplitude of such load changes may be constant or may change (e.g., increase and/or decrease) over time. In examples, the oscillation of load adjustments may be implemented at a frequency higher than that of the vehicle body (e.g., oscillating load adjustments at 3 Hz or higher where the natural frequency of the vehicle body may be around 1.5 Hz). Other determined amplitudes and/or frequencies of load adjustment oscillations may be used based on various factors. In this way, such load adjustments may be manipulated to increase traction, determine traction measurements, and/or increase passenger safety and comfort.

In examples, the vehicle computing system may repeatedly (e.g., rapidly) increase and decrease the load at one or more individual wheels while not doing so at the remaining wheels. For example, the vehicle computing system may determine to perform oscillatory load adjustments at one or more wheels that are subject to, or predicted to experience, a reduction in traction. The vehicle computing system may then determine or detect traction (e.g., as wheel slip, via wheel encoder measurements, and/or via other wheel sensor measurements) at various points (e.g., per oscillation) to determine whether the traction reduction is ongoing and/or one or more wheel positions at which the determined traction is relatively greatest and/or least. When normal traction is detected (e.g., at all wheels), the vehicle computing system may adjust one or more active suspension components to return the individual wheels to normal loads and/or otherwise normalize the suspension (e.g., cease repeated load adjustments).

In examples, in response to detecting an adverse traction condition or a potential splash impact condition at a surface on which the vehicle is or will be traversing, the vehicle computing system may modify the steering configuration at individual wheels of the vehicle using one or more (e.g., four-wheel) steering components. For example, a wheel encountering an adverse traction condition or a potential splash impact condition, such as a puddle, may slow down relative to the remaining wheels of the vehicle that are not encountering the puddle. This slowing of a single wheel may have the effect of pulling the vehicle in the direction of that wheel (e.g., "steering" the vehicle toward the puddle). In response to detecting this condition and/or in anticipation of encountering such a condition (e.g., based on detecting a puddle in the vehicle's trajectory using sensor data), the vehicle computing system may adjust one or more wheel steering components to steer one or more wheels away from the puddle to counteract the steering effect introduced by the puddle. For example, the affected wheel may be steered away for the anticipated or detected direction of steering introduced by the puddle. Since the steering capability of that wheel may be reduced due to the traction reduction introduced by the puddle, one or more of the other wheels may also be steered in a counter-direction, such as the cross-corner wheel.

In examples, the steering components may be controlled by the vehicle computing system to assist in slowing the vehicle without, or in addition to, using brakes. For instance, the use of brakes in adverse traction conditions or potential splash impact conditions may be unpredictable or even dangerous as some wheels with less traction may lock up or otherwise slow more rapidly than other wheels, resulting in potential loss of control and/or unpredictable vehicle behavior. To more safely slow the vehicle, in response to detecting a current or imminent adverse traction condition or potential splash impact condition, the vehicle computing system may steer a set of wheels at one or both axles towards or away from one another to increase drag at the wheels and slow the vehicle (e.g., without using brakes).

When normal traction conditions are detected (e.g., at all wheels), the vehicle computing system may adjust one or more steering components to return the individual wheels to normal steering positions (e.g., straight ahead and/or along an intended vehicle trajectory).

Examples of techniques for dynamically configuring and steering individual wheels of a vehicle can be found, for example, in U.S. patent application Ser. No. 17/126,761, filed Dec. 18, 2020, and titled "Dynamic Vehicle Suspension and Steering Adjustment," and U.S. patent application Ser. No. 17/671,217, filed Feb. 14, 2022, and titled "Updating Vehicle Models for Improved Suspension Control," the contents of each of which are herein incorporated by reference in their entirety and for all purposes.

The systems and techniques described herein may be directed to leveraging vehicle and environmental sensor data to enable a vehicle, such as an autonomous vehicle, to more accurately predict and detect adverse traction conditions for individual wheels of the vehicle. These systems and techniques may also be directed to leveraging vehicle and environmental sensor data to enable a vehicle, such as an autonomous vehicle, to more accurately predict and detect potential splash impact conditions for individual wheels of the vehicle. These predictions and detections may in turn be used to leverage active suspension components and individual-wheel steering components configured at the vehicle for improved vehicle control and facilitating safer (e.g., for passengers and those outside the vehicle) and more efficient navigation through an environment. In particular examples, the systems and techniques described herein can utilize data structures containing data representing detected surface and environmental conditions, individual wheel load and other suspension configurations, and individual wheel steering positions and other steering configurations. By using the dynamic wheel configuration adjustment techniques described herein to increase the available traction to individual wheels of a vehicle and to the vehicle as a whole, the examples described herein may result in increased safety and accuracy of vehicle control, especially during traversal of surface that may include adverse traction conditions and/or potential splash impact conditions, thereby allowing an autonomous vehicle to more safely operate in an environment.

For example, the techniques described herein may be faster and/or more robust than conventional techniques, as they may increase the ability of an autonomous vehicle to safely navigate in an environment by using more accurate determinations of adverse tractions conditions and potential splash impact conditions, thereby facilitating more efficient and effective implementation of mitigating operations to address such conditions. This, in turn, may result in safer operation of the vehicle by avoiding collisions with, and splashing of, objects in the environment. The techniques described herein may also facilitate the use of active suspension technology and four-wheel steering technology, which in turn may increase the maneuverability of a vehicle. Such increased maneuverability may increase the ability of an autonomous vehicle to safely navigate in an environment by allowing the vehicle to safely maneuver around and through hazards that a vehicle configured with traditional suspension and steering components may not be able to avoid. This increased maneuverability may also increase the efficiency of an autonomous vehicle by allowing the vehicle to travel along paths that may be difficult or impossible for a traditionally configured vehicle to traverse (e.g., paths with surfaces that introduce adverse traction conditions). The ability to implement the active suspension and individualized steering capabilities more effectively using the disclosed techniques may also increase the safety of vehicle operations by allowing the increase of stability as needed using such capabilities. Additionally, the disclosed techniques allow the full use of four-wheel steered bidirectional vehicles because these techniques may be implemented in either travel direction in a bidirectional vehicle.

The techniques described herein may also enable improved trajectories and more efficient and safe operation of a vehicle by enabling a vehicle to travel along a trajectory that may include adverse traction conditions and/or potential splash impact conditions rather than along a longer trajectory that avoids such conditions. That is, the techniques described herein provide a technological improvement over existing vehicle control techniques and vehicle suspension and steering technology. The techniques described herein may also improve the operation of computing systems and increase resource utilization efficiency. For example, computing systems, such as vehicle computing systems, may more efficiently perform condition determinations and vehicle control operations using the techniques described herein because the disclosed examples may reduce the amount of data needed to represent a vehicle state and the calculations required to determine vehicle control data by eliminating predicting surface conditions and anticipating control operations needed to safely traverse such surfaces, thereby reducing the need for the sudden data and control instruction generation in response to unexpected conditions that would be required using conventional techniques, thereby reducing the data processing required in many circumstances to determine and predict vehicle operations and operational data.

The systems and techniques described herein can be implemented in a number of ways. Example implementations are provided below with reference to the following figures. Although discussed in the context of an autonomous vehicle with four wheels, the techniques described herein can be applied to a variety of systems (e.g., a sensor system or a robotic platform) and are not limited to autonomous vehicles or to vehicles with four wheels. For example, the techniques described herein can be applied to semi-autonomous and/or manually operated vehicles, three-wheeled vehicles, two-wheeled vehicles (e.g., motorcycles), and vehicles with more than four wheels (e.g., trucks having six or more wheels). In other examples, the techniques can be utilized in an aviation or nautical context, or in any system involving vehicle controls, active suspensions, and/or individual-wheel steering systems. Further, although discussed in the context of originating with particular types of sensor data and processing with particular types of components, data, and data structures as described herein can include any two-dimensional, three-dimensional, or multi-dimensional data and data associated with any other types of sensors (e.g., cameras, lidar, radar, sonar, time-of-flight, and the like). Additionally, the techniques described herein can be used with real data (e.g., captured using sensor(s)), simulated data (e.g., generated by a simulator, training data, and the like), or any combination of the two.

FIG. 1 is a pictorial flow diagram of an example process 100 for determining and addressing adverse traction conditions using dynamic wheel configuration adjustments. In examples, one or more operations of the process 100 may be implemented by a vehicle computing system, such as by using one or more of the components and systems illustrated in FIG. 6 and described below. For example, such one or more components and systems can include any of those associated with the vehicle computing system(s) 604, the active suspension system(s) 632, the individual wheel suspension controller 634, the individual wheel steering controller 636, the sensor system(s) 606, and the perception component 622 illustrated in FIG. 6. In examples, the one or more operations of the process 100 may be performed by a remote system in communication with a vehicle, such as the computing devices(s) 642 and the perception component 648 illustrated in FIG. 6. In still other examples, the one or more operations of the process 100 may be performed by a combination of a remote system and a vehicle computing systems. However, the process 100 is not limited to being performed by such components and systems, and the components and systems of FIG. 6 are not limited to performing the process 100.

At operation 102, a vehicle computing system may receive sensor data representing an environment. For example, a vehicle, such as an autonomous vehicle, operating within an environment and associated with the vehicle computing system may be configured with sensors that may capture sensor data in the environment and provide environmental sensor data. Alternatively or additionally, the vehicle computing system may receive sensor data received from one or more remote sensors. The sensor data may be captured by and/or otherwise associated with one or more sensors of any type, such as cameras, sonar sensors, lidar sensors, radar sensors, time-of-flight sensors, etc. The vehicle computing system may also receive mapping data that may provide topographical data and data that may be collected by other vehicles that may be used to determine current road conditions. Other data that may be used to determine conditions, such as weather data, traffic data, etc. may also be received and/or otherwise determined at operation 102.

At operation 102, the vehicle computing system may also, or instead, receive vehicle data associated with components and systems of the vehicle. For example, the vehicle computing system may receive data from one or more wheel speed sensors and/or wheel encoders (e.g., rotary encoders) that may indicate the rotation of the wheels and/or the traction at the individual wheels. The vehicle computing system may also, or instead, receive data from one or more inertial sensors (e.g., inertial measurement units (IMUs), accelerometers, gyroscopes, magnetometers, etc.) that may indicate or may be used to determine traction and/or other data associated with individual wheels of the vehicle. The vehicle computing system may also, or instead receive any other type of data from any other vehicle components or systems that may be used to determine traction at individual wheels and/or detect an adverse traction condition. The vehicle computing system may also, or instead receive any other type of sensor data (e.g., environmental sensor data) that may be used to determine traction at individual wheels and/or detect an adverse traction condition.

At operation 104, the vehicle computing system may determine imminent roadway conditions. For example, using the sensor data obtained at operation 102, the vehicle computing system may determine roadway conditions for the portion of a roadway that the vehicle will be traversing (e.g., soon) based on a planned trajectory for the vehicle. At operation 104, the vehicle computing system may determine specific attributes of the roadway in order to determine one or more conditions. For example, the vehicle computing system may determine if there is liquid present in the roadway and, if so, one or more characteristics of such liquid. For instance, the vehicle computing system may determine a liquid type (e.g., water, oil, a mixture of types of liquids, etc.), a liquid depth, liquid motion (standing water, moving water, stationary oil slick, etc.), dimensions of the surface occupied by the liquid, etc. Based on these and/or any other detectable attributes of the roadway ahead of the vehicle, the vehicle computing system may determine whether there are any surfaces in the planned path of travel of the vehicle that represents adverse traction conditions (e.g., unbalanced or uneven adverse traction conditions).

For example, the vehicle computing system may use mapping data that includes topographical data and/or surface geometrical data to determine a probability of adverse traction conditions in the path of travel. For instance, the vehicle computing system may determine a lower elevation portion on a roadway surface that may have limited drainage. The vehicle computing system may further determine current precipitation in the environment (e.g., based on weather data, sensor data, etc.). The vehicle computing system may use such data to determine an extent and/or location of a liquid on the surface. Based on this data, the vehicle computing system may determine that there may likely be an adverse traction condition at the location of that lower elevation portion (e.g., a puddle). The vehicle computing system may further determine particular depths of elevation associated with such a portion of the surface and particular amounts of precipitation to further refine determinations of adverse traction conditions (e.g., determine deeper and shallower portions of a puddle, etc.).

In examples, the vehicle computing system may use mapping data that includes previously collected data to determine a probability of adverse traction conditions in the path of travel. For instance, the vehicle computing system May determine, based on annotated mapping data, that previous vehicles and/or users have indicated or otherwise detected an adverse traction condition on a roadway surface and/or have indicated conditions that are associated with an adverse traction condition on the surface. Based on this data, the vehicle computing system may determine that there may likely be an adverse traction condition at that portion of the surface. In such examples, the vehicle computing system may use also use other received data to make such a determination. For example, the vehicle computing system may compare sensor data to the annotated map data to determine similarities and/or differences between current conditions and the conditions in the environment at the time the annotated mapping data was collected. The vehicle computing system may also, or instead, determine whether the annotated mapping data is current, a confidence associated with such data, etc. to determine adverse traction conditions.

At operation 106, the vehicle computing system may determine current wheel traction conditions. For example, the vehicle computing system may use data received from one or more vehicle components and/or sensor data to determine traction at individual wheels of the vehicle. Based on this data, the vehicle may determine whether one or more of the wheels is currently experiencing a reduction or loss of traction. In examples, the vehicle computing system may compare the traction determined for individual wheels to determine if one or more wheels are experiencing a loss of traction relative to one or more of the other wheels. In various examples, the operations 104 and 106 may be performed substantially in parallel, while in other examples they may be performed sequentially.

In examples, the vehicle computing system may use previously collected data combined with more recently collected data to determine a traction condition. For example, the vehicle computing system may compare a roadway surface elevation as determined based on sensor data to a wheel position determined based on a wheel sensor (e.g., wheel height sensor, wheel load sensor, etc.) or one or more other vehicle component sensors. If a current wheel at a particular surface location has a position indicating a depth that is lower than expected based on the elevation determined for the particular surface location using sensor data, the vehicle computing system may determine that the wheel is in a surface depression that contains liquid (e.g., a puddle). The vehicle computing system may use such data to determine a depth estimate for this surface depression. The vehicle computing system may then determine a probability of a current adverse traction condition for that wheel based on the determination that the wheel is in a liquid-filled surface depression and/or the depth estimate for such a depression. The vehicle computing system may also, or instead, transmit data indicating one or more such determinations to a remote system and/or one or more other vehicles, for example, for use as annotated mapping data.

An example 108 illustrates a vehicle 110 traveling in an environment on a roadway 114. The vehicle 110 may be configured with one or more sensors and/or components that may be configured to provide data as described herein for use in determining wheel traction and roadway surface conditions. The vehicle 110 may be a four-wheeled vehicle configured with wheels 112*a-d*. Standing water 116 may be covering a portion of the surface of the roadway 114. The standing water 116 may be a relatively still volume of water of any depth distributed over a contiguous portion of the surface of the roadway 114 and may include other matter (e.g., dirt, oil, etc.). A vehicle computing system configured at the vehicle 110 may receive and/or determine data that may be used to detect and/or classify the standing water 116 and/or the current traction at the individual wheels 112*a-d*.

At operation 118, the vehicle computing system may determine whether there are one or more imminent and/or current adverse traction conditions. For example, based on the environmental sensor data received at operation 102 and the conditions determined at operation 104, the vehicle computing system may determine whether the planned trajectory of the vehicle will result in the vehicle encountering an adverse traction condition detected in the environment. The vehicle computing system may also, or instead, based on the data received at operation 102 and the conditions determined at operation 106, determine whether one or more wheels of the vehicle are currently experiencing an adverse traction condition.

If no adverse traction condition is predicted or currently being detected by one or more wheels at operation 118, the process 100 may return to operation 102 to continue to analyze available data and monitor for adverse traction conditions.

If, at operation 118, the vehicle computing system determines that an adverse traction condition is predicted or currently occurring at one or more wheels, at operation 120 the vehicle computing system may adjust one or more configurations of one or more wheels to improve overall vehicle traction. For example, and as described in more detail herein, the vehicle computing system may raise the vehicle body relative to all the wheels, increase and/or decrease load at one or more wheels using active suspension components, rapidly and repeatedly increase and/or decrease load at one or more wheels, and/or individually steer one or more wheels. The operations performed at 120 may be based on the type of adverse traction event predicted and/or occurring. Any of the suspension adjustments described herein or any combination thereof may be implemented at operation 120 to increase traction at one or more individual wheels and/or for the vehicle overall.

An example 122 illustrates the vehicle 110 traveling in an environment on the roadway 114 and having advanced onto a portion of the surface of the roadway 114 occupied by the standing water 116. As can be seen in this example, the leading axle driver's side wheel 112*a* is approximately in the middle of the standing water 116, the leading axle passenger's side wheel 112*b* is at an outer edge of the standing water 116, and the trailing axle wheels 112*c* and 112*d* remain outside of the standing water 116.

In this example, as an initial mitigation measure based on detection of the standing water 116, the vehicle computing system may adjust the configurations at the individual wheels of the vehicle 110. For example, the vehicle computing system may control active suspension components to raise the vehicle body relative to the individual wheels 112*a-d* a similar amount to raise the vehicle body over the standing water 116.

Also, or instead, the vehicle computing system configured at the vehicle 110 may have determined that the wheel 112*a* is subject to, or likely to experience, a significant reduction in traction due to the standing water 116. The vehicle computing system may further determine that the wheel 112*b* is subject to, or likely to experience, a reduction in traction due to the standing water 116 that is less than the reduction in traction for the wheel 112*a*. The vehicle computing system may further determine that the wheels 112*c* and 112*d* are not currently experiencing a reduction in traction. Based on these determinations, the vehicle computing system may adjust the configurations at the individual wheels of the vehicle 110. For example, the vehicle computing system may control active suspension components to reduce the load at the wheel 112*a* due to its loss of traction (and, in some examples, increase the load at the wheel 112*b*), shifting the vehicle 110's load to the wheel 112*b* that may have better traction. To counter this shift and balance the vehicle 110's load (and thereby maintain improved control of the vehicle and passenger comfort), the vehicle computing system may also control active suspension components to reduce the load at the cross-corner wheel 112*d* (and, in some examples, increase the load at the wheel 112*c*).

In example 122, the vehicle computing system may also, or instead, rapidly and/or repeatedly increase and decrease the load (e.g., in an oscillatory and/or sinusoidal manner) at one or more of the wheels 112*a-d*. For example, the vehicle computing system may repeatedly increase and decrease the load at the wheel 112*a* while measuring traction at that wheel to determine a load of the wheel 112*a* associated with the greatest traction. The vehicle computing system may then configure the wheel at that load once determined. To counter the effects of this wheel load oscillation on the vehicle 112 and/or the passengers that may be seated therein, the vehicle computing system may also repeatedly increase and decrease the load at the wheel 112*d*, for example, in phase with the oscillatory load adjustments of the cross-corner wheel 112*a*. The vehicle computing system may perform similar rapid and/or repeated load adjustments at the cross-corner wheels 112*b* and 112*c*. To improve stability and control of the vehicle, load adjustments at the wheels 112*b* and 112*c* may be out of phase with the load adjustments applied at the wheels 112*a* and 112*d*.

In example 122, the vehicle computing system may also, or instead, adjust the steering configuration of the individual wheels 112*a-d*. For example, to counter the drag introduced by the standing water 116 that may pull the vehicle 110 towards the standing water 116, the vehicle computing system may steer the individual wheels 112*a* and 112*d* away from the standing water 116 while maintaining the planned steering configuration of the wheels 112*b* and 112*c*. Alternatively or additionally, because braking the vehicle 110 while it is traversing the standing water 116 may introduce unpredictable and potentially unsafe vehicle behavior, the vehicle computing system may steer the individual wheels 112*a* and 112*b* on the leading axle inward relative to the direction of travel and/or the wheels 112*c* and 112*d* outward relative to the direction of travel to slow the vehicle without applying the brakes. Other individual wheel steering adjustments may also, or instead, be implemented by the vehicle computing system using one or more individual-wheel steering components.

At operation 124, the vehicle computing system may determine whether one or more other adverse traction conditions have been detected and/or predicted. For example, the vehicle computing system may use (e.g., updated) sensor and/or vehicle component data to detect and/or predict one or more adverse traction conditions that differ from the conditions for which the wheel(s) were adjusted at operation 120. In other words, the vehicle computing system may determine, at operation 124 whether additional changes to the suspension and/or steering configurations may be implemented to further improve the overall traction for the vehicle. If so, the process 100 may return to the operation 120 to further adjust the configuration of the wheels using any of the techniques described herein to improve traction. For example, as the vehicle passes through standing water, the vehicle computing system may determine that different wheels are subject to different adverse traction conditions than initially determined. The vehicle computing system may responsively adjust the wheels further to address these changed conditions (as described in more detail herein).

If the adverse traction conditions are substantially similar to those addressed by the adjustments of operation 120, the vehicle computing system may maintain these adjustments at operation 126.

At operation 128, the vehicle computing system may determine whether the determined adverse traction condition(s) are still occurring or predicted to occur. If so, the process 100 may return to operation 124 to determine if there has been any change in the currently occurring and/or predicted determined adverse traction condition(s). If there are no further predicted and/or detected adverse traction condition(s) determined at operation 128, at operation 130 the vehicle computing system may resume normal suspension configurations for the individual wheels and return to operation 102 to continue to analyze available data and monitor for adverse traction conditions.

An example 132 illustrates the vehicle 110 traveling in an environment on the roadway 114 after having traversed and passed through the surface of the roadway 114 occupied by the standing water 116. As can be seen in this example, the individual wheels 112*a-d* of the vehicle are outside of the standing water 116. In response to determining that none of the wheels 112*a-d* are currently or predicted to be subject to adverse tractions conditions, the vehicle computing system may have returned the suspension and/or steering configurations of the individual wheels 112*a-d* to normal settings or to setting not otherwise associated with addressing adverse traction conditions.

In examples, the process 100 may be implemented in an autonomous vehicle, for example in conjunction with a planned trajectory used by a vehicle computing device to control the autonomous vehicle. For example, the vehicle computing system may autonomously control a vehicle using a planned trajectory that may be determined based on a determined adverse traction condition, for example, by a planning component. The planning component may obtain or determine adverse traction condition data to determine a trajectory through an environment that avoids or minimizes a likelihood of the vehicle encountering a surface in the environment that is associated with an adverse traction condition. Alternatively or additionally, the planning component may obtain or determine adverse traction condition data to determine a trajectory for autonomous control of the vehicle that includes one or more controls to adjust one or more suspension components as described herein based on the adverse traction condition. These and any other examples described herein may be used to control or assist in controlling any type of fully and/or partially autonomous vehicles.

FIG. 2 is a pictorial flow diagram of an example process 200 for determining and addressing adverse traction conditions using dynamic wheel loading adjustments. In examples, one or more operations of the process 200 may be implemented by a vehicle computing system, such as by using one or more of the components and systems illustrated in FIG. 6 and described below. For example, such one or more components and systems can include any of those associated with the vehicle computing system(s) 604, the active suspension system(s) 632, the individual wheel suspension controller 634, the individual wheel steering controller 636, the sensor system(s) 606, and the perception component 622 illustrated in FIG. 6. In examples, the one or more operations of the process 200 may be performed by a remote system in communication with a vehicle, such as the computing devices(s) 642 and the perception component 648 illustrated in FIG. 6. In still other examples, the one or more operations of the process 200 may be performed by a combination of a remote system and a vehicle computing systems. However, the process 200 is not limited to being performed by such components and systems, and the components and systems of FIG. 6 are not limited to performing the process 200.

At operation 202, a predicted and/or currently occurring adverse traction condition may be determined as described herein. For example, a vehicle computing system may determine that one or more wheels of a vehicle at which it is configured is predicted to encounter standing water, an oil slick, slush, etc. on a surface associated with the vehicle's planned trajectory (e.g., a detected or predicted trajectory, a planned trajectory for autonomous control of the vehicle, etc.). Alternatively or additionally, the vehicle computing system may determine, for example, based on vehicle component data, that one or more wheels of the vehicle are currently encountering an adverse traction condition (e.g., experiencing a reduction in traction, generally or relative to other wheels).

An example 204 illustrates a vehicle 206 traveling in an environment on a roadway. The vehicle 206 may be configured with one or more sensors and/or components that may be configured to provide data as described herein for use in determining wheel traction and roadway surface conditions. The vehicle 206 may be a four-wheeled vehicle configured with wheels 208*a-d*. Standing water 210 may be covering a portion of the surface of the roadway that may be along a planned trajectory for the vehicle 206. The standing water 210 may be a relatively still volume of water of any depth distributed over a contiguous portion of the surface of the roadway and may include other matter (e.g., dirt, oil, etc.). In this example, the standing water 210 may have a deeper portion 210a of a greater depth than a shallower portion 210b. A vehicle computing system configured at the vehicle 206 may receive and/or determine data that may be used to detect and/or classify the standing water 210 and/or the current traction at the individual wheels 208a-d. In examples, the vehicle computing system may determine an approximate and/or relative depth of the portions 210a and 210b of the standing water 210, for example, based on topographical data (e.g., from mapping data) and/or sensor data, as described in more detail herein.

At operation 212, based on one or more detected or predicted adverse traction conditions determined at operation 212, the vehicle computing system may adjust the load of individual wheels of the vehicle. For example, the vehicle computing system may control one or more active suspension components to increase and decrease the load at particular individual wheels. The vehicle computing system may determine that a driver's side wheel on a particular axle of the vehicle may be or is currently encountering an adverse traction condition (e.g., when that wheel traverses a puddle located in the vehicle's trajectory). The vehicle computing system may further determine that the passenger's side wheel on that axle will not encounter this adverse traction condition or will encounter a lesser adverse traction condition (e.g., a condition that does not result in as much traction reduction). The vehicle computing system may, in response, determine that the driver's side wheel on that axle is likely to have reduced traction. The vehicle computing system may adjust one or more active suspension components to reduce the load at the driver's side wheel on that axle in preparation for adverse traction condition(s). The vehicle computing system may further increase the load at the opposite wheel that has greater relative traction. The vehicle computing system may also improve the balance of the load of the vehicle by performing an opposite adjustment on the other axle by adjusting one or more active suspension components to reduce the load at the passenger's side wheel on the remaining axle and increase the load at the driver's side wheel on that axle.

In example 214, the leading axle of the vehicle 206 may be encountering the standing water 210, with the wheel 208a encountering the deeper portion 210b of the standing water 210, while the wheel 208b may be encountering the shallower portion 210a of the standing water 210. In response to predicting and/or detecting this scenario, the vehicle computing system of the vehicle 206 may reduce the load at the wheel 208a that may be predicted and/or determined to have less traction due to the deeper portion 210b of standing water 210. The vehicle computing system may also increase the load at the wheel 208b that may be predicted and/or determined to have more traction relative to the wheel 208a due to encountering the shallower portion 210a of standing water 210 instead of the deeper portion 210b. To improve vehicle stability and control, as well as passenger comfort, the vehicle computing system may perform counterpart cross-corner suspension adjustments by reducing the load at the wheel 208d and increasing the load at the wheel 208c. The wheel load adjustments are illustrated by the wheel arrows shown in example 214, where a downward arrow indicated an increased load and an upward arrow indicated a reduced load. In various examples, the vehicle computing may have also generally raised the vehicle body relative to all of the wheels 208a-d (e.g., using suspension components) in preparation for encountering the standing water 210. In such examples, the subsequent cross-corner load adjustments may be relative to the initially raised height of the vehicle body at the wheels.

At operation 216, the vehicle computing system may determine if there has been a change in the detected (or predicted) adverse traction condition. If not, the vehicle computing system may maintain the current suspension adjustments implemented to address the detected or predicted adverse traction condition, returning again to operation 216 to monitor for changes in the condition.

If the vehicle computing system determines, at operation 216, that there has been a change in the adverse traction condition, at operation 218, the vehicle computing system may determine if an adverse traction condition is still occurring or predicted to occur. If so, the vehicle computing system may, at operation 220, perform further adjustments to the suspension configuration of individual wheels to address the changed adverse traction conditions. For example, the vehicle computing system may increase and/or decrease the load at different wheels and/or otherwise adjust the load at one or more individual wheels based on the detected and/or predicted adverse traction condition.

In example 222, as compared to the example 214, the leading axle of the vehicle 206 may have passed through the standing water 210, with the wheels 208a and 208b no longer in any portion of the standing water 210. However, the trailing axle wheels may now be in the standing water 210, with the wheel 208c in the deeper portion 210b of the standing water 210 and the wheel 208d in the shallower portion of the standing water 210. In response to predicting and/or detecting this changed adverse traction scenario (e.g., relative to the scenario of example 214), the vehicle computing system of the vehicle 206 may reduce the load at the wheel 208c from its prior relatively higher-load configuration since that wheel may now be predicted and/or determined to have less traction due to the deeper portion 210b of standing water 210. The vehicle computing system may also increase the load at the wheel 208d from its prior relatively lower-load configuration since that wheel may now be predicted and/or determined to have more traction relative to the wheel 208c due to encountering the shallower portion 210a of standing water 210 instead of the deeper portion 208a. To adjust the suspension to improve vehicle stability and control, as well as passenger comfort, the vehicle computing system may perform counterpart cross-corner suspension adjustments by reducing the load at the wheel 208b from its prior relatively higher-load configuration and increasing the load at the wheel 208a from its prior relatively lower-load configuration. The updated wheel load adjustments are illustrated by the wheel arrows shown in example 222 (up arrow indicating reduced load, down arrow indicating increased load). By adjusting the suspension configuration at the individual wheels as the adverse condition changes during vehicle travel, the vehicle computing system may maintain control and stability of the vehicle in changing traction conditions.

If the vehicle computing system determines, at operation 216, that there has been a change in the adverse traction condition and, at operation 218, the vehicle computing system determines that no adverse traction condition is occurring or predicted to occur, at operation 224 the vehicle computing system may return the wheel configurations to normal heights and/or loading (e.g., equally distributed load among the individual wheels) and/or perform further adjustments to normalize the suspension configuration for the individual wheels.

In example 226, as compared to the example 222, both the leading axle of the vehicle 206 with the wheels 208a and 208b and the trailing axle of the vehicle 206 with the wheels 208c and 208c are no longer in any portion of the standing water 210. In response to determining that there are no adverse traction conditions detected or predicted, the vehicle computing system of the vehicle 206 may return the wheels to normal operating loading (e.g., reducing the load at the wheels 208a and 208d to normal load and increasing the load at the wheels 208b and 208d to normal load from their prior adjusted loads).

FIG. 3 is a pictorial flow diagram of an example process 300 for determining and addressing adverse traction conditions using repeated dynamic wheel loading adjustments. In examples, one or more operations of the process 300 may be implemented by a vehicle computing system, such as by using one or more of the components and systems illustrated in FIG. 6 and described below. For example, such one or more components and systems can include any of those associated with the vehicle computing system(s) 604, the active suspension system(s) 632, the individual wheel suspension controller 634, the individual wheel steering controller 636, the sensor system(s) 606, and the perception component 622 illustrated in FIG. 6. In examples, the one or more operations of the process 300 may be performed by a remote system in communication with a vehicle, such as the computing devices(s) 642 and the perception component 648 illustrated in FIG. 6. In still other examples, the one or more operations of the process 300 may be performed by a combination of a remote system and a vehicle computing systems. However, the process 300 is not limited to being performed by such components and systems, and the components and systems of FIG. 6 are not limited to performing the process 300.

At operation 302, a predicted and/or currently occurring adverse traction condition may be determined as described herein. For example, a vehicle computing system may determine that one or more wheels of a vehicle at which it is configured is predicted to encounter standing water, an oil slick, slush, etc. on a surface associated with the vehicle's planned trajectory (e.g., a detected or predicted trajectory, a planned trajectory for autonomous control of the vehicle, etc.). Alternatively or additionally, the vehicle computing system may determine, for example, based on vehicle component data, that one or more wheels of the vehicle are currently encountering an adverse traction condition (e.g., experiencing a reduction in traction, generally or relative to other wheels).

An example 304 illustrates a vehicle 306 traveling in an environment on a roadway. The vehicle 306 may be configured with one or more sensors and/or components that may be configured to provide data as described herein for use in determining wheel traction and roadway surface conditions. The vehicle 406 may be a four-wheeled vehicle configured with wheels 308a-d. Standing water 310 may be covering a portion of the surface of the roadway that may be along a planned trajectory for the vehicle 306. The standing water 310 may be a relatively still volume of water of any depth distributed over a contiguous portion of the surface of the roadway and may include other matter (e.g., dirt, oil, etc.). In this example, the standing water 310 may have a deeper portion 310a of a greater depth than a shallower portion 310b. A vehicle computing system configured at the vehicle 306 may receive and/or determine data that may be used to detect and/or classify the standing water 310 and/or the current traction at the individual wheels 308a-d. In examples, the vehicle computing system may determine an approximate and/or relative depth of the portions 310a and 310b of the standing water 310.

At operation 312, based on one or more detected or predicted adverse traction conditions determined at operation 312, the vehicle computing system may dynamically vary the load at one or more individual wheels of the vehicle. In various examples, the vehicle computing system may repeatedly and/or rapidly increase and decrease the load at one or more individual wheels using active suspension components to vary the amount of load on such individual wheels in an oscillatory and/or sinusoidal manner. The extent of such oscillatory load increase and decrease may be based on the amount of traction determined for such wheels. For instance, the vehicle computing system may determine an individual wheel that has, or is likely to have, reduced traction due to an adverse traction condition. The vehicle computing system may then repeatedly increase and decrease the load at that wheel (e.g., rapidly), which may vary the amount of traction at the wheel, and then may determine the traction (e.g., measure wheel slip) at the wheel at various loads. This may allow the vehicle computing system to determine a wheel load that provides the greatest traction, which it may then use to adjust the suspension configuration for that wheel to set the wheel at that load (e.g., for use in techniques such as that described in FIG. 2) and/or to configure other wheels for loads relative to that load (e.g., to determine a load for a cross-corner wheel and/or to determine inverse loads for other wheels). The oscillating changes in wheel load may also, or instead, increase overall wheel traction at that wheel over the period of repeated load adjustments and/or for the vehicle. The vehicle computing system may perform oscillatory adjustments to the one or more other wheels, for example, to balance out vertical vehicle motion that such oscillatory adjustments may introduce in order to improve passenger comfort.

These oscillatory adjustments may be used in conjunction with the cross-corner suspension adjustments as described in regard to FIG. 2. For example, the vehicle computing system may determine a particular cross-corner adjustment for the vehicle's wheels to improve overall traction during traversal of a surface that may introduce an adverse traction condition (e.g., reduce load at the leading axle passenger's side wheel and trailing axle driver's side wheel, increase load at the trailing axle passenger's side wheel and leading axle driver's side wheel). The vehicle computing system may then repeatedly (e.g., rapidly) increase and decrease the load at the individual wheels about a median wheel load used for the initial cross-corner suspension adjustments. The vehicle computing system may implement these repeated load adjustments at the individual wheel in an oscillatory and/or sinusoidal manner. In examples, the vehicle computing system may implement these oscillatory suspension adjustments at the individual wheels so that passenger comfort and vehicle control are improved (e.g., so that individual wheels oscillate out of phase with one another and/or at particular phases relative to the other wheels).

In examples, the vehicle computing system may repeatedly (e.g., rapidly) increase and decrease the load at one or more individual wheels while not doing so at the remaining wheels. For example, the vehicle computing system may determine to perform oscillatory and/or sinusoidal load adjustments at a wheel that is subject to, or predicted to encounter, a reduction in traction (and, in examples, a cross-corner wheel). The vehicle computing system may then determine or detect traction or wheel slip at that wheel (e.g., via wheel encoder measurements and/or other wheel sensor measurements) at various points (e.g., per oscillation, at points along a sinusoidal curve representing the load adjustments, etc.) to determine whether the traction reduction is ongoing. The vehicle computing system may also, or instead, monitor this wheel during these varying load adjustments to determine a wheel position at which the detected traction is relatively greatest and/or least.

In example 314, the leading axle of the vehicle 306 may be encountering the standing water 310, with the wheel 308*a* encountering the deeper portion 310*b* of the standing water 310, while the wheel 308*b* may be encountering the shallower portion 310*a* of the standing water 310. In response to predicting and/or detecting this scenario, the vehicle computing system of the vehicle 306 may rapidly and repeatedly increase and decrease the load at the wheel 308*a* that may be predicted and/or determined to have less traction due to the deeper portion 310*b* of standing water 310. The vehicle computing system may also rapidly and repeatedly increase and decrease the load at the cross-corner wheel 308*d* (e.g., out of phase with the oscillatory adjustments of the wheel 308*a*) to improve vehicle stability and control, as well as passenger comfort. The oscillatory wheel load adjustments are indicated by the wheel arrows in example 314 (e.g., up/down arrows indicating oscillating load adjustments).

At operation 316, the vehicle computing system may determine if there has been a change in the detected (or predicted) adverse traction condition. If not, the vehicle computing system may maintain the current varying suspension adjustments implemented to address the detected or predicted adverse traction condition, returning again to operation 316 to monitor for changes in the condition. Alternatively or additionally, the vehicle computing system may determine at operation 316 whether improved load configurations have been determined for one or more wheels based on the dynamic load variation applied to such wheels. If so, the vehicle computing system may determine that this may mitigate the adverse traction condition and may implement that load configuration for the corresponding wheel(s) and may further determine that the adverse traction condition is reduced or eliminated based on the adjusted wheel load(s).

If the vehicle computing system determines, at operation 316, that there has been a change in the adverse traction condition, at operation 318, the vehicle computing system may determine if an adverse traction condition is still occurring or predicted to occur. If so, the vehicle computing system may, at operation 320, perform further varying load adjustments to the suspension configuration of individual wheels to address the changed adverse traction conditions. For example, the vehicle computing system may repeatedly and rapidly increase and decrease the load at different wheels and/or adjust the amount of variance and/or load fluctuations for individual wheels based on the detected and/or predicted adverse traction condition.

In example 322, as compared to the example 314, the leading axle of the vehicle 306 may have passed through the standing water 310, with the wheels 308*a* and 308*b* no longer in any portion of the standing water 310. However, the trailing axle wheels may now be in the standing water 310, with the wheel 308*c* in the deeper portion 310*b* of the standing water 310 and the wheel 308*d* in the shallower portion of the standing water 310. In response to predicting and/or detecting this updated adverse traction scenario, the vehicle computing system of the vehicle 306 may rapidly and repeatedly increase and decrease the load at the wheel 308*c* that may be predicted and/or determined to have less traction due to the deeper portion 310*b* of standing water 310. The vehicle computing system may also rapidly and repeatedly increase and decrease the load at the cross-corner wheel 308*b* (e.g., out of phase with the oscillatory adjustments of the wheel 308*a*) to improve vehicle stability and control, as well as passenger comfort. In examples, the vehicle computing system may have ceased rapidly and repeatedly increase and decrease the load at the wheels 308*a* and 308*d*. Alternatively, the vehicle computing system may rapidly and repeatedly increase and decrease the load at all the individual wheels to determine traction for the individual wheels and/or to improve vehicle stability, control, and passenger comfort. The oscillatory wheel load adjustments are indicated by the wheel arrows in example 322.

If the vehicle computing system determines, at operation 316, that there has been a change in the adverse traction condition and, at operation 318, the vehicle computing system determines that no adverse traction condition is occurring or predicted to occur, at operation 324 the vehicle computing system may return the wheel configurations to normal heights and/or loading (e.g., equally distributed load among the individual wheels) and/or perform further adjustments to normalize the suspension configuration for the individual wheels, for example, by ceasing rapidly and repeatedly increase and decrease the load at any of the wheels.

In example 326, as compared to the example 322, both the leading axle of the vehicle 306 with the wheels 308*a* and 308*b* and the trailing axle of the vehicle 306 with the wheels 308*c* and 308*c* are no longer in any portion of the standing water 310. In response to determining that there are no adverse traction conditions detected or predicted, the vehicle computing system of the vehicle 306 may return the wheels to normal suspension configurations, with no rapid and/or repeated increase and decrease of the load at any of the wheels.

FIG. 4 is a pictorial flow diagram of an example process 400 for determining and addressing adverse traction conditions using repeated dynamic wheel loading adjustments. In examples, one or more operations of the process 400 may be implemented by a vehicle computing system, such as by using one or more of the components and systems illustrated in FIG. 6 and described below. For example, such one or more components and systems can include any of those associated with the vehicle computing system(s) 604, the active suspension system(s) 632, the individual wheel suspension controller 634, the individual wheel steering controller 636, the sensor system(s) 606, and the perception component 622 illustrated in FIG. 6. In examples, the one or more operations of the process 400 may be performed by a remote system in communication with a vehicle, such as the computing devices(s) 642 and the perception component 648 illustrated in FIG. 6. In still other examples, the one or more operations of the process 400 may be performed by a combination of a remote system and a vehicle computing systems. However, the process 400 is not limited to being performed by such components and systems, and the components and systems of FIG. 6 are not limited to performing the process 400.

At operation 402, a predicted and/or currently occurring adverse traction condition may be determined as described herein. Here again, a vehicle computing system may determine that one or more wheels of a vehicle at which it is configured is predicted to encounter standing water, an oil slick, slush, etc. on a surface associated with the vehicle's planned trajectory (e.g., a detected or predicted trajectory, a planned trajectory for autonomous control of the vehicle, etc.). Alternatively or additionally, the vehicle computing system may determine, for example, based on vehicle component data, that one or more wheels of the vehicle are currently encountering an adverse traction condition (e.g., experiencing a reduction in traction, generally or relative to other wheels).

An example 404 illustrates a vehicle 406 traveling in an environment on a roadway. The vehicle 406 may be configured with one or more sensors and/or components that may be configured to provide data as described herein for use in determining wheel traction and roadway surface conditions. The vehicle 406 may be a four-wheeled vehicle configured with wheels 408*a*-*d*. Standing water 410 may be covering a portion of the surface of the roadway that may be along a planned trajectory for the vehicle 406. The standing water 410 may be a relatively still volume of water of any depth distributed over a contiguous portion of the surface of the roadway and may include other matter (e.g., dirt, oil, etc.). In this example, the standing water 410 may have a deeper portion 410*a* of a greater depth than a shallower portion 410*b*. A vehicle computing system configured at the vehicle 406 may receive and/or determine data that may be used to detect and/or classify the standing water 410 and/or the current traction at the individual wheels 408*a*-*d*. In examples, the vehicle computing system may determine an approximate and/or relative depth of the portions 410*a* and 410*b* of the standing water 410.

At operation 412, based on one or more detected or predicted adverse traction conditions determined at operation 412, the vehicle computing system may dynamically adjust one or more steering configurations at individual wheels of the vehicle using one or more (e.g., four-wheel) steering components. For example, to offset the slowing and resulting pulling introduced at a wheel that encounters standing water (e.g., relative to other wheels), the vehicle computing system may adjust the steering for that wheel to steer it away from the standing water. The vehicle computing system may further adjust one or more of the other wheels to assist in this offsetting of the slowing of the wheel encountering an adverse traction condition, such as similarly steering a cross-corner wheel.

Also, or instead, at operation 412, the vehicle computing system may control steering components to assist in slowing the vehicle without, or in addition to, using brakes (which may be unpredictable or hazardous in adverse traction conditions). For example, in response to detecting a current or imminent adverse traction condition, the vehicle computing system may steer a set of wheels at one or both axles towards or away from one another (e.g., in a "plowing" configuration) to increase drag at the wheels and slow the vehicle (e.g., without using brakes).

Note that the steering adjustments described herein may be used in combination with any of the suspension adjustments also described herein. For example, one or more wheels may be individually steered to address one or more adverse traction conditions while one or more (of the same or different) wheels at the same vehicle may be load-adjusted as described herein to address those conditions.

In example 414, the leading axle of the vehicle 406 may be encountering the standing water 410, with the wheel 408*a* encountering the deeper portion 410*b* of the standing water 410, while the wheel 408*b* may be predicted to encounter an edge of the shallower portion 410*a* of the standing water 410. In response to predicting and/or detecting this scenario, the vehicle computing system of the vehicle 406 may steer the wheel 408*a* that may be predicted and/or determined to have less traction due to the deeper portion 410*b* of standing water 410 away for the deeper portion 410*b* as the deeper portion 410*b* may be predicted to pull the vehicle 406 towards the portion 410*b* by slowing the wheel 408*a* relative to the remaining wheels 408*b*-*d*. The vehicle computing system may also similarly steer the wheel 408*d* to assist in controlling the vehicle in the intended direction despite the pulling on wheel 408*a* introduced by the standing water 410. The wheels 408*b* and 408*c* may remain steered straight ahead and/or otherwise along the planned vehicle trajectory. The individual wheel steering adjustments are indicated by the wheel arrows in example 414.

At operation 416, the vehicle computing system may determine if there has been a change in the detected (or predicted) adverse traction condition. If not, the vehicle computing system may maintain the current steering adjustments implemented to address the detected or predicted adverse traction condition, returning again to operation 416 to monitor for changes in the condition.

If the vehicle computing system determines, at operation 416, that there has been a change in the adverse traction condition, at operation 418, the vehicle computing system may determine if an adverse traction condition is still occurring or predicted to occur. If so, the vehicle computing system may, at operation 420, perform further steering adjustments to the individual wheels to address the changed adverse traction conditions. For example, the vehicle computing system may steer different wheels and/or adjust the steering of any of the individual wheels to address the changed adverse traction condition(s).

In example 422, as compared to the example 414, the leading axle of the vehicle 406 may have passed through the standing water 410, with the wheels 408*a* and 408*b* no longer in any portion of the standing water 410. However, the trailing axle wheels may now be in the standing water 410, with wheel 408*c* in the deeper portion 410*b* of the standing water 410 and the wheel 408*d* in the shallower portion of the standing water 410. In response to predicting and/or detecting this updated adverse traction scenario, the vehicle computing system of the vehicle 406 may adjust the steering of the individual wheels to slow the vehicle 406. To safely slow the vehicle, the vehicle computing system may steer leading axle wheels 408*a* and 408*b* inward (relative to the direction of travel of the vehicle 406) to form a "plow" configuration, while steering trailing axle wheels 408*c* and 408*d* outward (relative to the direction of travel of the vehicle 406) to increase drag at the wheels and slow the vehicle (e.g., without using brakes). The individual wheel steering adjustments are indicated by the wheel arrows in example 422.

If the vehicle computing system determines, at operation 416, that there has been a change in the adverse traction condition and, at operation 418, the vehicle computing system determines that no adverse traction condition is occurring or predicted to occur, at operation 424 the vehicle computing system may return the wheel steering configurations to normal steering function and/or perform further adjustments to normalize the steering configuration for the individual wheels.

In example 426, as compared to the example 422, both the leading axle of the vehicle 406 with the wheels 408*a* and 408*b* and the trailing axle of the vehicle 406 with the wheels 408*c* and 408*c* are no longer in any portion of the standing water 410. In response to determining that there are no adverse traction conditions detected or predicted, the vehicle computing system of the vehicle 406 may return the wheels 408*a*-*d* to normal steering configurations, steering the vehicle 406 along a planned vehicle trajectory.

FIG. 5 is a pictorial flow diagram of an example process 500 for determining and addressing potential splash conditions using dynamic wheel loading adjustments. In examples, one or more operations of the process 500 may be implemented by a vehicle computing system, such as by using one or more of the components and systems illustrated in FIG. 6 and described below. For example, such one or more components and systems can include any of those associated with the vehicle computing system(s) 604, the active suspension system(s) 632, the individual wheel suspension controller 634, the individual wheel steering controller 636, the sensor system(s) 606, and the perception component 622 illustrated in FIG. 6. In examples, the one or more operations of the process 500 may be performed by a remote system in communication with a vehicle, such as the computing devices(s) 642 and the perception component 648 illustrated in FIG. 6. In still other examples, the one or more operations of the process 500 may be performed by a combination of a remote system and a vehicle computing systems. However, the process 500 is not limited to being performed by such components and systems, and the components and systems of FIG. 6 are not limited to performing the process 500.

At operation 502, a vehicle computing system may receive sensor data representing an environment in which the associated vehicle is traveling. This sensor data may include lidar data, radar data, sonar data, images, etc. Using this sensor data, the vehicle computing system may identify and/or classify objects and surfaces in the environment. For example, the vehicle computing system may identify pedestrians, animals, bicycles, motorcycles, VRUs, open vehicles (e.g., vehicles with an open door, truck, hatch, etc.), and/or any other objects and/or conditions for which a splashing of liquid may be undesirable. The vehicle computing system may further identify liquids that may be capable of being splashed on such objects, such as standing or running water. The vehicle computing system may also, or instead, determine whether the vehicle's planned trajectory brings the vehicle into contact with detected splashable liquids.

An example 504 illustrates a vehicle 506 traveling in an environment. The vehicle 506 may be configured with one or more sensors and/or components that may be configured to provide data as described herein for use in determining objects in the environment, including splashable liquid and object vulnerable to splashes of such liquids. The vehicle 506 may be a four-wheeled vehicle configured with wheels 508a-d. The vehicle 506 may be traveling along a planned trajectory 510 that may be associated with particular vehicle speeds and corresponding vehicle positions. Standing water 512 may be covering a portion of the surface of a roadway 514 in the environment on which the vehicle is traveling based on the planned trajectory 510 for the vehicle 506. The standing water 512 may be a relatively still volume of water of any depth distributed over a contiguous portion of the surface of the roadway and may include other matter (e.g., dirt, oil, etc.). A pedestrian 516 may be located on a sidewalk 518 proximate to the roadway 514, as well as proximate to the standing water 512.

In this example, a vehicle computing system configured at the vehicle 506 may receive and/or determine data that may be used to detect and/or classify the standing water 512 and/or the pedestrian 516. In examples, the vehicle computing system may determine an approximate and/or relative depth of the standing water 512, for example, based on topographical data (e.g., from mapping data) and/or sensor data, as described herein. The vehicle computing system may use these detections and related data to determine a potential splash impact condition.

At operation 520, a potential splash impact condition may be determined as described herein. For example, a vehicle computing system may determine that one or more wheels of a vehicle at which it is configured is predicted to encounter a liquid, such as standing water, an oil slick, slush, etc., on a surface associated with the vehicle's planned trajectory (e.g., a detected or predicted trajectory, a planned trajectory for autonomous control of the vehicle, etc.). The vehicle computing system may further determine that a splash-vulnerable object (e.g., pedestrian, open vehicle, VRU, etc.) is proximate to the detected liquid. Based on these determinations, the vehicle computing system may determine that a potential splash impact condition exists at the location of the liquid.

At operation 522, based on the potential splash impact condition determined at operation 520, the vehicle computing system may decrease the speed of the vehicle or otherwise adjust a vehicle trajectory so that the vehicle slows before encountering the liquid. In examples, the vehicle computing system may implement such slowing using the vehicle brakes, reducing throttle, and/or implementing vehicle-slowing steering configuration changes (e.g., setting one or both sets of wheels to a "plowing" configuration as described herein). Alternatively or additionally at operation 522, the vehicle computing system may alter the steering configuration to counter the drag that may be introduced by the liquid, as described herein.

The vehicle computing system may also, or instead, at operation 522, adjust the load of one or more of the individual wheels of the vehicle to reduce the potential splash that may be created when the wheel(s) encounters the liquid. The vehicle computing system may determine that a driver's side wheel on a particular axle of the vehicle may be or is currently encountering a potential splash impact condition (e.g., when that wheel traverses a puddle located in the vehicle's trajectory and proximate to a splash-vulnerable object). The vehicle computing system may, in response, adjust one or more active suspension components to reduce the load on the driver's side wheel on that axle is likely to encounter the potential splash impact condition. In some examples, the vehicle computing system may further increase and/or decrease the load at one or more other wheels (e.g., increase load at the opposite wheel on the same axle, perform cross-corner load adjustments as described herein, etc.) to maintain improved control of the vehicle and/or balance the load. Alternatively, the vehicle computing system may adjust the load on the wheel expected to encounter the potential splash impact condition without adjusting the load or the other wheels.

In examples, the vehicle computing system may predict or otherwise splash impact parameters that the vehicle computing system may use to determine suspension adjustments. For example, the vehicle computing system may determine a predicted splash radius for one or more of the vehicle wheels 508a-b that may be predicted to encounter the standing water 512. The vehicle computing system may further predict such splash radii for a variety of speeds at which the individual wheels may be traveling. The vehicle computing system may then determine a speed sufficient to reduce one or more of the predicted splash radii that does not overly slow the vehicle 506, thereby determining a speed safe for those outside the vehicle without unnecessarily slowing the vehicle 506. Alternatively or additionally, the vehicle computing system may determine an area of the standing water 512 that creates the potential splash impact condition and may steer the vehicle around that area (e.g., through a portion of the standing water 512 that does not generate a potential splash impact condition (e.g., at a particular speed and/or at a particular suspension adjustment) or around the standing water 512 altogether).

The vehicle computing system may also, or instead, perform a similar determination for suspension adjustments. For example, the vehicle computing system may determine a predicted splash radius for one or more of the vehicle wheels 508*a*-*b* that may be predicted to encounter the standing water 512 for a variety of suspension adjustments (e.g., loads) for such wheels. The vehicle computing system may then determine one or more suspension adjustments that may reduce one or more of the predicted splash radii without reducing the load more than needed, thereby determining a load at one or more wheels that may reduce splash impact without overly reducing traction.

These determinations may be used in conjunction. For example, the vehicle computing system may determine a speed and load reduction that will reduce a splash radius for a particular wheel such that the splash is unlikely to impact a pedestrian but maintains a productive vehicle speed and relatively good traction at that wheel. Alternatively, these determinations may be used individually.

In example 524, the vehicle computing system of the vehicle 506 may have determined, based on the standing water 512 and the pedestrian 516 relatively proximate to the standing water 512, that a potential splash impact condition is present at the location of the standing water 512. In response to this determination, the vehicle computing system may reduce the vehicle speed to mitigate the splash impact. For example, the vehicle computing system may modify the vehicle trajectory 510 to generate a trajectory 526 that has lower speed controls for the vehicle positions associated with the standing water 512. In examples, the vehicle computing system of the vehicle 506 may take into account predicted splash radii as described above in determining these speed and suspension adjustments.

The vehicle computing system may further determine that the leading axle of the vehicle 506, and specifically the wheel 508*b*, may be encountering this potential splash impact condition at the location of the standing water 512. In response, the vehicle computing system of the vehicle 506 may reduce the load at the wheel 508*b* that may be predicted and/or determined to encounter standing water 512. The vehicle computing system may also increase the load at the wheel 508*a* to improve overall vehicle traction (e.g., because overall vehicle traction may otherwise be reduced due to the reduced load at the wheel 508*b*). To improve vehicle stability and control, as well as passenger comfort, the vehicle computing system may perform counterpart cross-corner suspension adjustments by reducing the load at the wheel 508*c* and increasing the load at the wheel 508*4*. The wheel load adjustments are illustrated by the wheel arrows shown in example 524, where a downward arrow indicated an increased load and an upward arrow indicated a reduced load. In various examples, the vehicle computing may have also generally raised the vehicle body relative to all of the wheels 508*a*-*d* (e.g., using suspension components) in preparation for encountering the standing water 512. In such examples, the subsequent cross-corner load adjustments may be relative to the initially raised height of the vehicle body at the wheels.

At operation 528, the vehicle computing system may determine if there has been a change in the detected (or predicted) potential splash impact condition relative to the vehicle. For example, the vehicle computing system may determine whether the same vehicle wheels are subject to the potential splash impact condition as when the wheels were previously adjusted to mitigate the splash impact, or if different wheels or no wheels are currently subject to the potential splash impact condition. Alternatively or additionally, the vehicle computing system may determine whether the condition has changed based on one or more factors. For example, the potentially affected object may have moved away from the liquid or the liquid may have drained off the roadway, thereby eliminating the potential splash impact. If there has been no change to wheels affected by the potential splash impact condition or to the condition itself, the vehicle computing system may maintain the current suspension adjustments implemented to address the detected potential splash impact condition, returning again to operation 528 to monitor for changes in the condition. In examples, the vehicle computing system may use data from one or more vehicle components (e.g., wheel sensors) to determine whether one or more wheels is (e.g., still) experiencing reduced traction. The vehicle computing system may use such data to determine if a potential splash condition still exists and/or has manifested at one or more of the vehicle wheels.

If the vehicle computing system determines, at operation 528, that there has been a change in the potential splash impact condition, at operation 530, the vehicle computing system may determine if a potential splash impact condition is still present. If so, the vehicle computing system may, at operation 532, perform further adjustments to the suspension configuration of individual wheels to address the changed potential splash impact condition. For example, the vehicle computing system may increase and/or decrease the load at different wheels and/or otherwise adjust the load at one or more individual wheels based on the detected potential splash impact condition. The vehicle computing system may also, or instead, (e.g., further) adjust the vehicle speed and/or steering configuration. For example, the vehicle computing system may determine that the liquid to be encountered is shallower or deeper than that previously encountered (e.g., as described herein) and may increase or decrease the vehicle speed accordingly. The vehicle computing system may also, or instead, change the steering configuration to counter drag that may now affect different wheels as the vehicle has passed through the liquid.

In example 534, as compared to the example 524, the leading axle of the vehicle 506 may have passed through the standing water 512, with the wheels 508*a* and 508*b* no longer in any portion of the standing water 512. However, the trailing axle wheels may now be traversing the standing water 512, with the wheel 508*d* traversing a potential splash impact condition by traveling through the portion of the standing water 512 proximate to the pedestrian 516. In response to detecting this changed potential splash impact scenario (e.g., relative to the scenario of example 524), the vehicle computing system of the vehicle 506 may adjust the speed of the vehicle 506. For example, the vehicle computing system may determine that the vehicle 506 is now passing through a shallower portion of the standing water 512 and therefore the vehicle speed may be increased without increasing the splash potential. In examples, the vehicle computing system may modify the vehicle trajectory 526 to generate a trajectory 536 that has lower speed controls for the vehicle positions associated with the standing water 512.

Further in response to detecting this changed potential splash impact scenario the vehicle computing system of the vehicle 506 may reduce the load at the wheel 508*d* from its prior relatively higher-load configuration since that wheel may now be determined to potentially generate a splash that may impact the pedestrian 516. The vehicle computing system may also increase the load at the wheel 508c from its prior relatively lower-load configuration to improve overall vehicle traction. To adjust the suspension to improve vehicle stability and control, as well as passenger comfort, the vehicle computing system may perform counterpart cross-corner suspension adjustments by reducing the load at the wheel 508a from its prior relatively higher-load configuration and increasing the load at the wheel 508b from its prior relatively lower-load configuration. The updated wheel load adjustments are illustrated by the wheel arrows shown in example 534 (up arrow indicating reduced load, down arrow indicating increased load). By adjusting the suspension configuration at the individual wheels as a potential splash impact condition changes during vehicle travel, the vehicle computing system may maintain control and stability of the vehicle while mitigating splash impact to splash-vulnerable objects in the environment. In examples, the vehicle computing system of the vehicle 506 may take into account predicted splash radii as described above in determining these speed and suspension adjustments.

If the vehicle computing system determines, at operation 528, that there has been a change in the potential splash impact condition and, at operation 530, the vehicle computing system determines that no potential splash impact condition is occurring or expected to be encountered, at operation 538 the vehicle computing system may return the wheel configurations to normal heights and/or loading (e.g., equally distributed load among the individual wheels) and/or perform further adjustments to normalize the suspension configuration for the individual wheels. The vehicle computing system may also return the vehicle to a normally planned speed.

In example 540, as compared to the example 534, all of the wheels 508a-d may no longer be in contact with any portion of the standing water 512. In response to determining that there are no potential splash impact conditions detected, the vehicle computing system of the vehicle 506 may resume operating the vehicle 506 at a normal (e.g., planned) speed and return the wheels 508a-d to normal operating loading (e.g., reducing the load at the wheels 508b and 508c to normal load and increasing the load at the wheels 508a and 508d to normal load from their prior adjusted loads). In examples, the vehicle computing system may modify the vehicle trajectory 536 to generate a trajectory 542 that has lower speed controls for the vehicle positions associated with the standing water 512.

Note that the suspension and steering adjustments described herein may be configured as controls on a trajectory associated with locations in an environment and implemented based on a vehicle location along such a trajectory. A current vehicle location may be determined using one or more localization operations. Adjustments to the suspension and/or steering configuration may be performed based on one or more controls in the trajectory when the vehicle arrives at a corresponding location and/or before the vehicle arrives at the corresponding location such that the configuration is in place when the vehicle arrives at the location.

FIG. 6 depicts a block diagram of an example system 600 for implementing the techniques described herein. In at least one example, the system 600 can include a vehicle 602. The vehicle 602 can include a vehicle computing system or device 604 that may function as and/or perform the functions of a vehicle controller for the vehicle 602. The vehicle 602 can also include one or more sensor systems 606, one or more emitters 608, one or more communication connections 610, at least one direct connection 612, and one or more drive systems 614.

The vehicle computing system(s) 604 can include one or more processors 616 and memory 618 communicatively coupled with the one or more processors 616. In the illustrated example, the vehicle 602 is an autonomous vehicle; however, the vehicle 602 could be any other type of vehicle. In the illustrated example, the memory 618 of the vehicle computing system(s) 604 stores a localization component 620, a perception component 622, a planning component 624, one or more system controllers 626, one or more maps 628, and a prediction component 630. Though depicted in FIG. 6 as residing in memory 618 for illustrative purposes, it is contemplated that each of the localization component 620, the perception component 622, the planning component 624, the one or more system controllers 626, the one or more maps 628, and the prediction component 630 can additionally, or alternatively, be accessible to the vehicle 602 (e.g., stored remotely).

In at least one example, the localization component 620 can include functionality to receive data from the sensor system(s) 606 to determine a position and/or orientation of the vehicle 602 (e.g., one or more of an x-, y-, z-position, roll, pitch, and yaw (h)). For example, the localization component 620 can include and/or request/receive a map of an environment and can continuously determine a location and/or orientation of the autonomous vehicle within the map. In some instances, the localization component 620 can utilize SLAM (simultaneous localization and mapping), CLAMS (calibration, localization, and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 620 can provide data to various components of the vehicle 602 to determine an initial position of an autonomous vehicle for generating a trajectory and/or for generating map data, as discussed herein.

In some instances, the perception component 622 can include functionality to perform object detection, segmentation, and/or classification. In some examples, the perception component 622 can provide processed sensor data that indicates a presence of an entity that is proximate to the vehicle 602 and/or a classification of the entity as an entity type (e.g., car, pedestrian, cyclist, animal, building, tree, road surface, curb, sidewalk, traffic signal, traffic light, car light, brake light, unknown, etc.). In examples, the perception component 622 can provide processed sensor data that indicates a condition of a surface and/or environment, such as an adverse traction condition on a surface or a potential splash impact condition along a vehicle trajectory (e.g., a detected or predicted trajectory, a planned trajectory for autonomous control of the vehicle, etc.). In additional or alternative examples, the perception component 622 can provide processed sensor data that indicates one or more characteristics associated with a detected entity (e.g., a tracked object) and/or the environment in which the entity is positioned. The perception component 622 may use multichannel data structures, such as the multichannel data structures generated by a deconvolution process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Such entity characteristics may be represented in a multichannel data structure (e.g., a multichannel data structure generated as output of one or more deconvolution layers (e.g., learned deconvolutional upsampling decoding layer (s)) using a learned upsampling transformation). Characteristics associated with the environment can include, but are not limited to, a presence of another entity in the environment, a state of another entity in the environment, a time of day, a day of a week, a season, a weather condition, an indication of darkness/light, etc.

In general, the planning component 624 can determine a path for the vehicle 602 to follow to traverse through an environment, for example, using sideslip vectors, four-wheeled steering-related operations, and other aspects described herein. In examples, the planning component 624 can determine various routes and trajectories and various levels of detail. For example, the planning component 624 can determine a route (e.g., planned route) to travel from a first location (e.g., a current location) to a second location (e.g., a target location). For the purpose of this discussion, a route can be a sequence of waypoints for traveling between two locations. As non-limiting examples, waypoints may include streets, intersections, global positioning system (GPS) coordinates, etc. Further, the planning component 624 can generate an instruction (e.g., control) for guiding the autonomous vehicle along at least a portion of the route from the first location to the second location. In at least one example, the planning component 624 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 602 to navigate.

In at least one example, the vehicle computing system(s) 604 can include one or more system controllers 626, which can be configured to control steering, propulsion, braking, safety, emitters, communication, and other systems of the vehicle 602. These system controller(s) 626 can communicate with and/or control corresponding systems of the drive system(s) 614 and/or other components of the vehicle 602. In examples, the systems controller(s) 626 may control active suspension components and/or steering components, such as active suspension system(s) 632, one or more individual wheel suspension controllers 634, and one or more individual wheel steering controllers 636.

The memory 618 can further include one or more maps 628 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 628 can include at least one map (e.g., images and/or a mesh). In some examples, the vehicle 602 can be controlled based at least in part on the maps 628. That is, the maps 628 can be used in connection with the localization component 620, the perception component 622, and/or the planning component 624 to determine a location of the vehicle 602, identify objects in an environment, and/or generate routes and/or trajectories to navigate within an environment.

In some examples, the one or more maps 628 can be stored on a remote computing device(s) (such as the computing device(s) 642) accessible via network(s) 640. In some examples, multiple maps 628 can be stored based on, for example, a characteristic (e.g., type of entity, time of day, day of week, season of the year, etc.). Storing multiple maps 628 can have similar memory requirements but increase the speed at which data in a map can be accessed.

In general, the prediction component 630 can generate predicted trajectories of objects in an environment. For example, the prediction component 630 can generate one or more predicted trajectories for vehicles, pedestrians, animals, and the like within a threshold distance from the vehicle 602. In some instances, the prediction component 630 can measure a trace of an object and generate a trajectory for the object based on observed and predicted behavior.

In some instances, aspects of some or all of the components discussed herein can include any models, algorithms, and/or machine learning algorithms. For example, in some instances, the components in the memory 618 (and the memory 646, discussed below) can be implemented as a neural network. For instance, the memory 618 may include a deep tracking network that may be configured with a convolutional neural network (CNN). The CNN may include one or more convolution/deconvolution layers.

An example neural network is an algorithm that passes input data through a series of connected layers to produce an output. Each layer in a neural network can also comprise another neural network or can comprise any number of layers, each of which may be convolutional, deconvolutional, or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling transformation. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 606 can include radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, acoustic sensors, microphones, wheel encoders, wheel sensors (e.g., wheel height sensors, wheel spin sensors, wheel load sensors, etc.), environment sensors (e.g., temperature sensors, humidity sensors, light sensors, pressure sensors, etc.), etc. The sensor system(s) 606 can include multiple instances of each of these or other types of sensors. For instance, the camera sensors can include multiple cameras disposed at various locations about the exterior and/or interior of the vehicle 602. The sensor system(s) 606 can provide input to the vehicle computing system(s) 604. Additionally, or alternatively, the sensor system(s) 606 can send sensor data, via the one or more networks 640, to the one or more computing device(s) at a particular frequency, after a lapse of a predetermined period of time, in near real-time, etc.

The vehicle 602 can also include one or more emitters 608 for emitting light (visible and/or non-visible) and/or sound. The emitter(s) 608 in an example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 602 can also include one or more communication connection(s) 610 that enable communication between the vehicle 602 and one or more other local or remote computing device(s). For instance, the communication connection(s) 610 can facilitate communication with other local computing device(s) on the vehicle 602 and/or the drive system(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing system(s) 604 to another computing device or a network, such as network(s) 640. For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 can include one or more drive systems 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include one or more sensor systems to detect conditions of the drive system(s) 614 and/or the surroundings of the vehicle 602. By way of example and not limitation, the sensor system(s) 606 can include one or more wheel encoders (e.g., rotary encoders) to sense rotation of the wheels of the drive systems, wheel sensors (e.g., wheel height sensors, wheel spin sensors, wheel load sensors, etc.) to sense various attributes of the wheels, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 614. Furthermore, the drive system(s) 614 may also include one or more communication connection(s) that enable communication by the respective drive system with one or more other local or remote computing device(s).

In at least one example, the direct connection 612 can provide a physical interface to couple the one or more drive system(s) 614 with the body of the vehicle 602. For example, the direct connection 612 can allow the transfer of energy, fluids, air, data, etc. between the drive system(s) 614 and the vehicle. In some instances, the direct connection 612 can further releasably secure the drive system(s) 614 to the body of the vehicle 602.

In some examples, the vehicle 602 can send sensor data, audio data, collision data, and/or other types of data to one or more computing device(s) 642 via the network(s) 640. In some examples, the vehicle 602 can send raw sensor data to the computing device(s) 642. In other examples, the vehicle 602 can send processed sensor data and/or representations of sensor data (e.g., multichannel data structures representing sensor data) to the computing device(s) 642. In some examples, the vehicle 602 can send sensor data to the computing device(s) 642 at a particular frequency, after a lapse of a predetermined period of time, in near real-time, etc. In some cases, the vehicle 602 can send sensor data (raw or processed) to the computing device(s) 642 as one or more log files.

The computing device(s) 642 can include processor(s) 644 and a memory 646 storing one or more perception components 648, and/or planning components 650. In some instances, the perception component 648 can substantially correspond to the perception component 622 and can include substantially similar functionality. In some instances, the planning component 650 can substantially correspond to the planning component 624 and can include substantially similar functionality.

The processor(s) 616 of the vehicle 602 and the processor(s) 644 of the computing device(s) 642 can be any suitable processor capable of executing instructions to process data and perform operations as described herein. By way of example and not limitation, the processor(s) 616 and 644 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 646 are examples of non-transitory computer-readable media. The memory 618 and 646 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in alternative examples, components of the vehicle 602 can be associated with the computing device(s) 642 and/or components of the computing device(s) 642 can be associated with the vehicle 602. That is, the vehicle 602 can perform one or more of the functions associated with the computing device(s) 642, and vice versa.

EXAMPLE CLAUSES

The following paragraphs describe various examples. Any of the examples in this section may be used with any other of the examples in this section and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving sensor data associated with an environment from a plurality of sensor systems of a vehicle traversing an environment; determining, based at least in part on the sensor data, an adverse traction condition associated with a surface in the environment on which the vehicle is predicted to traverse; determining, based at least in part on the adverse traction condition and a planned vehicle trajectory, a first wheel configured proximate to a leading edge of the vehicle associated with reduced traction; based at least in part on determining the first wheel associated with reduced traction, reducing a first load at the first wheel; based at least in part on reducing the first load at the first wheel: reducing a second load at a second wheel configured proximate to a trailing edge of the vehicle, wherein the second wheel is a cross-corner wheel relative to the first wheel; increasing a third load at a third wheel configured proximate to the leading edge; and increasing a fourth load at a fourth wheel configured proximate to the trailing edge; and controlling the vehicle in the environment based at least in part on the planned vehicle trajectory.

B: The system of paragraph A, wherein the operations further comprise repeatedly modifying the first load at the first wheel and the second load at the second wheel.

C: The system of paragraph B, wherein the operations further comprise: determining a first plurality of wheel tractions corresponding to a first plurality of loads at the first wheel while repeatedly modifying the first load at the first wheel; and configuring the first wheel at a fifth load based at least in part on the first plurality of wheel tractions.

D: The system of paragraph C, wherein the operations further comprise configuring the second wheel at a sixth load based at least in part on the fifth load.

E: The system of any of paragraphs A-D, wherein the operations further comprise, based at least in part on determining the first wheel associated with reduced traction, modifying a steering configuration of the first wheel.

F: One or more non-transitory computer-readable media storing instructions that, when executed by one or more processors, perform operations comprising: receiving data captured by a sensor associated with a vehicle operating in an environment; determining, based at least in part on the data, an adverse traction condition associated with a surface in the environment; determining, based at least in part on the data and the adverse traction condition, a first wheel of the vehicle associated with reduced traction; based at least in part on determining the first wheel associated with reduced traction, implementing a first suspension configuration of the first wheel and a second suspension configuration of a second wheel of the vehicle, wherein the first wheel is a cross-corner wheel relative to the second wheel; and controlling the vehicle in the environment based at least in part on the first suspension configuration and the second suspension configuration.

G: The one or more non-transitory computer-readable media of paragraph F, wherein controlling the vehicle in the environment comprises autonomously controlling the vehicle based at least in part on a trajectory comprising a representation of the surface.

H: The one or more non-transitory computer-readable media of paragraph F or G, wherein: implementing the first suspension configuration comprises reducing a first load of the first wheel; and implementing the second suspension configuration comprises reducing a second load of the second wheel.

I: The one or more non-transitory computer-readable media of any of paragraphs F-H, wherein: the data comprises wheel sensor data for the first wheel; and determining the adverse traction condition comprises determining the first wheel associated with reduced traction based at least in part on the wheel sensor data for the first wheel.

J: The one or more non-transitory computer-readable media of any of paragraphs F-I, wherein the operations further comprise: receiving second data captured by the sensor; determining, based at least in part on the second data, that the first wheel is associated with increased traction; and based at least in part on determining that the first wheel is associated with increased traction, implementing a third suspension configuration of the first wheel and a fourth suspension configuration of the second wheel.

K: The one or more non-transitory computer-readable media of paragraph J, wherein: implementing the first suspension configuration comprises reducing a first load of the first wheel; implementing the second suspension configuration comprises reducing a second load of the second wheel; implementing the third suspension configuration comprises increasing the first load of the first wheel; and implementing the second suspension configuration comprises increasing the second load of the second wheel.

L: The one or more non-transitory computer-readable media of any of paragraphs F-K, wherein the first suspension configuration comprises repeatedly modifying a first load of the first wheel.

M: The one or more non-transitory computer-readable media of paragraph L, wherein the second suspension configuration comprises repeatedly modifying a second load of the second wheel in phase with the repeatedly modifying of the first load.

N: The one or more non-transitory computer-readable media of any of paragraphs F-M, wherein the first suspension configuration comprises a steering configuration.

O: A method comprising: receiving data captured by a sensor associated with a vehicle operating in an environment; determining, based at least in part on the data, an adverse traction condition; determining, based at least in part on the data, a first wheel of the vehicle associated with reduced traction; based at least in part on determining the first wheel associated with reduced traction, implementing a first wheel configuration of the first wheel and a second wheel configuration of a second wheel of the vehicle, wherein the first wheel is a cross-corner wheel relative to the second wheel; and controlling the vehicle in the environment based at least in part on the first wheel configuration and the second wheel configuration.

P: The method of paragraph O, wherein: the first wheel configuration comprises steering the first wheel in a first direction; and the second wheel configuration comprises steering the second wheel in the first direction.

Q: The method of paragraph O or P, wherein: the first wheel configuration comprises steering the first wheel toward a third wheel configured at a same axle of the vehicle as the first wheel; and the method further comprises steering the third wheel towards the first wheel.

R: The method of any of paragraphs O-Q, wherein: the first wheel configuration comprises steering the first wheel away from a third wheel configured at a same axle of the vehicle as the first wheel; and the method further comprises steering the third wheel away from the first wheel.

S: The method of any of paragraphs O-R, further comprising determining the first wheel configuration based at least in part on a plurality of traction measurements associated with a plurality of loads applied to the first wheel.

T: The method of any of paragraphs O-S, wherein the adverse traction condition comprises an aquaplane condition.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
  receiving sensor data associated with an environment from a plurality of sensor systems of a vehicle traversing an environment;
  determining, based at least in part on the sensor data, an adverse traction condition associated with a surface in the environment on which the vehicle is predicted to traverse;
  predicting, based at least in part on the adverse traction condition and a planned vehicle trajectory:
    a first traction condition for a first wheel of a plurality of wheels configured at the vehicle, and
    a second traction condition for a second wheel of the plurality of wheels, wherein the second traction condition is distinct from the first traction condition;
  determining, based at least in part on a first traction condition, that the first wheel is associated with reduced traction;
  based at least in part on determining the first wheel is associated with reduced traction:
    reducing a first load at the first wheel;
    reducing a second load at a third wheel of the plurality of wheels that is a cross-corner wheel relative to the first wheel;
    increasing a third load at the second wheel; and
    increasing a fourth load at a fourth wheel of the plurality of wheels; and
  controlling the vehicle in the environment based at least in part on the planned vehicle trajectory.

2. The system of claim 1, wherein the operations further comprise repeatedly modifying the first load at the first wheel and the second load at the third wheel.

3. The system of claim 2, wherein the operations further comprise:
  determining a first plurality of wheel tractions corresponding to a first plurality of loads at the first wheel while repeatedly modifying the first load at the first wheel; and
  configuring the first wheel at a fifth load based at least in part on the first plurality of wheel tractions.

4. The system of claim 3, wherein the operations further comprise configuring the third wheel at a sixth load based at least in part on the fifth load.

5. The system of claim 1, wherein the first wheel is configured proximate to a leading edge of the vehicle.

6. One or more non-transitory computer-readable media storing instructions that, when executed by one or more processors, perform operations comprising:
  receiving data captured by a sensor associated with a vehicle operating in an environment;
  determining, based at least in part on the data, an adverse traction condition associated with a surface in the environment;
  predicting, based at least in part on the data and the adverse traction condition:
    a first traction condition for a first wheel of a plurality of wheels configured at the vehicle, and a second traction condition for a second wheel of the plurality of wheels, wherein the second traction condition is distinct from the first traction condition;
  implementing a first suspension configuration of the first wheel based at least in part on the first traction condition;
  implementing a second suspension configuration of the second wheel based at least in part on the second traction condition, wherein the first suspension configuration is distinct from the second suspension configuration, wherein the first wheel is a cross corner wheel relative to the second wheel; and
  controlling the vehicle in the environment based at least in part on the first suspension configuration and the second suspension configuration.

7. The one or more non-transitory computer-readable media of claim 6, wherein controlling the vehicle in the environment comprises autonomously controlling the vehicle based at least in part on a trajectory comprising a representation of the surface.

8. The one or more non-transitory computer-readable media of claim 6, wherein:
  implementing the first suspension configuration comprises reducing a first load of the first wheel; and
  implementing the second suspension configuration comprises increasing a second load of the second wheel.

9. The one or more non-transitory computer-readable media of claim 6, wherein:
  the data comprises wheel sensor data for the first wheel; and
  determining the adverse traction condition comprises determining the first traction condition based at least in part on the wheel sensor data for the first wheel.

10. The one or more non-transitory computer-readable media of claim 6, wherein the operations further comprise:
  receiving second data captured by the sensor;
  determining, based at least in part on the second data, that the first wheel is associated with increased traction; and
  based at least in part on determining that the first wheel is associated with increased traction, implementing a third suspension configuration of the first wheel and a fourth suspension configuration of the second wheel.

11. The one or more non-transitory computer-readable media of claim 10, wherein:
  implementing the first suspension configuration comprises reducing a first load of the first wheel;
  implementing the second suspension configuration comprises increasing a second load of the second wheel;
  implementing the third suspension configuration comprises increasing the first load of the first wheel; and
  implementing the second suspension configuration comprises reducing the second load of the second wheel.

12. The one or more non-transitory computer-readable media of claim 6, wherein the first suspension configuration comprises repeatedly modifying a first load of the first wheel.

13. The one or more non-transitory computer-readable media of claim 12, wherein the second suspension configuration comprises repeatedly modifying a second load of a third wheel of the plurality of wheels in phase with the repeatedly modifying of the first load.

14. The one or more non-transitory computer-readable media of claim 13, wherein the first traction condition is associated with reduced traction.

15. A method comprising:
  receiving data captured by a sensor associated with a vehicle operating in an environment;

determining, based at least in part on the data, an adverse traction condition;

predicting, based at least in part on the adverse traction condition and a planned vehicle trajectory:

a first traction condition for a first wheel of a plurality of wheels configured at the vehicle, and a second traction condition for a second wheel of a plurality of wheels, wherein the second traction condition is distinct from the first traction condition;

implementing a first wheel configuration of the first wheel based at least in part on the first traction condition;

implementing a second wheel configuration of the second wheel based at least in part on the second traction condition, wherein the first wheel configuration is distinct from the second wheel configuration, wherein the first wheel is a cross corner wheel relative to the second wheel; and controlling the vehicle in the environment based at least in part on the first wheel configuration and the second wheel configuration.

16. The method of claim 15, wherein:

the first wheel configuration comprises steering the first wheel in a first direction; and the second wheel configuration comprises steering the second wheel in a second direction distinct from the first direction.

17. The method of claim 15, wherein:

the first wheel configuration comprises steering the first wheel toward a third wheel configured at a same axle of the vehicle as the first wheel; and the method further comprises steering the third wheel towards the first wheel.

18. The method of claim 15, wherein:

the first wheel configuration comprises steering the first wheel away from a third wheel configured at a same axle of the vehicle as the first wheel; and the method further comprises steering the third wheel away from the first wheel.

19. The method of claim 15, further comprising determining the first wheel configuration based at least in part on a plurality of traction measurements associated with a plurality of loads applied to the first wheel.

20. The method of claim 15, wherein the adverse traction condition comprises an aquaplane condition.

* * * * *